United States Patent
Francis et al.

(10) Patent No.: US 7,452,575 B2
(45) Date of Patent: *Nov. 18, 2008

(54) LIQUID CRYSTAL MEDIUM AND LIQUID CRYSTAL DISPLAY WITH A HIGHLY TWISTED STRUCTURE

(75) Inventors: Matthew Francis, Chandlers Ford (GB); Mark Goulding, Ringwood (GB); Juliane Suermann, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 208 days.

This patent is subject to a terminal disclaimer.

(21) Appl. No.: 10/537,805

(22) PCT Filed: Nov. 13, 2003

(86) PCT No.: PCT/EP03/12693

§ 371 (c)(1),
(2), (4) Date: Jun. 7, 2005

(87) PCT Pub. No.: WO2004/053022

PCT Pub. Date: Jun. 24, 2004

(65) Prior Publication Data

US 2006/0027784 A1 Feb. 9, 2006

(30) Foreign Application Priority Data

Dec. 7, 2002 (DE) ............... 102 57 218

(51) Int. Cl.
*C09K 19/30* (2006.01)
*C09K 19/12* (2006.01)
*C09K 19/20* (2006.01)

(52) U.S. Cl. ............. 428/1.1; 252/299.63; 252/299.66; 252/299.67

(58) Field of Classification Search ............ 252/299.01, 252/299.63, 299.66, 299.67, 299.7; 428/1.1
See application file for complete search history.

(56) References Cited

U.S. PATENT DOCUMENTS

| 5,231,528 | A |   | 7/1993  | Escher et al. |
|---|---|---|---|---|
| 5,295,009 | A |   | 3/1994  | Barnik et al. |
| 5,976,407 | A |   | 11/1999 | Tarumi et al. |
| 6,149,990 | A | * | 11/2000 | Egami et al. ............... 428/1.1 |
| 6,565,932 | B2 | * | 5/2003 | Iwamatsu et al. ........... 428/1.1 |
| 6,660,345 | B2 | * | 12/2003 | Coates et al. ............... 428/1.1 |
| 6,858,268 | B2 | * | 2/2005 | Suermann et al. .......... 428/1.1 |
| 2001/0004108 | A1 |   | 6/2001 | Iwamatsu et al. |
| 2002/0003827 | A1 | * | 1/2002 | Genack et al. ............... 372/51 |
| 2003/0052305 | A1 |   | 3/2003 | Coates et al. |
| 2004/0054196 | A1 |   | 3/2004 | Kirsch et al. |
| 2004/0173775 | A1 | * | 9/2004 | Suermann et al. ...... 252/299.63 |

FOREIGN PATENT DOCUMENTS

| DE | 196 27 350   | 1/1998 |
| DE | 197 07 807   | 9/1998 |
| DE | 100 39 377   | 3/2001 |
| EP | 0 404 081    | 12/1990 |
| WO | WO 91/06613  | 5/1991 |
| WO | WO 02/34739  | 5/2002 |
| WO | WO 02/094805 | 11/2002 |
| WO | WO 02/100979 | 12/2002 |

OTHER PUBLICATIONS

Fischer F et al: "Molekulares Verdrillungsvermoegen Von Kohlenhydrat-Derivaten, Helical Twisting Power, Carbohydrates, Induced Cholesteric Phase Diastereomers, Liquid Crystals" Zeitschrift Fuer Naturforschung A, A Journal of Physical Sciences, Tuebingen, DE, Bd. 43, No. 12, Dec. 1, 1988; Seiten 1119-1125.

* cited by examiner

*Primary Examiner*—Shean C Wu
(74) *Attorney, Agent, or Firm*—Millen, White, Zelano, Branigan, P.C.

(57) ABSTRACT

The invention relates to a liquid crystal medium with a highly twisted structure, to the use of said medium for optoelectronic applications in the fields of non-linear optics (NLO) and laser optics and to electrooptic devices, displays and lasers containing said medium.

20 Claims, 1 Drawing Sheet

LIQUID CRYSTAL MEDIUM AND LIQUID CRYSTAL DISPLAY WITH A HIGHLY TWISTED STRUCTURE

The present invention relates to a liquid-crystalline medium having high twist, to the use thereof for electro-optical applications, in nonlinear optics (NLO) and laser optics, and to electro-optical devices, displays and lasers containing this medium.

Liquid-crystal displays (LC displays) are known from the prior art. The commonest display devices are based on the Schadt-Helfrich effect and contain an LC medium having a twisted nematic structure, such as, for example, TN ("twisted nematic") cells having twist angles of typically 90° and STN ("super-twisted nematic") cells having twist angles of typically 180 to 270°. Also known are ferroelectric LC displays which contain an LC medium having a twisted smectic structure. The twisted structure in these displays is usually achieved by addition of one or more chiral dopants to a nematic or smectic LC medium.

Also known are LC displays which contain LC media having a chiral nematic or cholesteric structure (CLC displays). CLC media have significantly higher twist compared with the LC media from TN and STN cells, with twist angles which are usually a multiple of 360°.

Cholesteric liquid crystals exhibit selective reflection of circular-polarised light, with the direction of rotation of the light vector corresponding to the direction of rotation of the cholesteric helix. The maximum $\lambda_{max}$ of the reflection band is given by the pitch p of the cholesteric helix and the mean refractive index n of the cholesteric liquid crystal in accordance with equation (1):

$$\lambda = n \cdot p \quad (1)$$

The width of the reflection band $\Delta\lambda$ is given by the helical pitch p and the birefringence $\Delta n$ of the cholesteric liquid crystal in accordance with equation (2):

$$\Delta\lambda = p \cdot \Delta n \quad (2)$$

The terms "chiral nematic" and "cholesteric" are used alongside one another in the prior art. "Chiral nematic" frequently denotes LC materials consisting of a nematic host mixture which has been doped with an optically active component which induces a helically twisted superstructure. By contrast, "cholesteric" frequently denotes chiral LC materials, for example cholesteryl derivatives, which have a "natural" cholesteric phase having a helical twist. The two terms are also used in parallel to denote the same thing. In the present application, the term "cholesteric" is used for both above-mentioned types of LC material, with this term being intended to cover the widest meaning of "chiral nematic" and "cholesteric" in each case.

Examples of customary CLC displays are the so-called SSCT ("surface stabilised cholesteric texture") and PSCT ("polymer stabilised cholesteric texture") displays. SSCT and PSCT displays usually contain a CLC medium which has, for example in the initial state, a planar structure which reflects light having a certain wavelength, and can be switched into a focally conical, light-scattering structure by application of an electrical alternating-voltage pulse, or vice versa. On application of a stronger voltage pulse, the CLC medium is converted into a homeotropic, transparent state, from where it relaxes into the planar state after rapid switching-off of the voltage or into the focally conical state after slow switching-off.

The planar alignment of the CLC medium in the initial state, i.e. before application of a voltage, is achieved in SSCT displays by, for example, surface treatment of the cell walls. In PSCT displays, the CLC medium additionally comprises a phase-separated polymer or polymer network which stabilises the structure of the CLC medium in the respective addressed state.

SSCT and PSCT displays usually do not require backlighting. In the planar state, the CLC medium in a pixel exhibits selective light reflection of a certain wavelength in accordance with the above equation (1), meaning that the pixel appears in the corresponding reflection colour, for example in front of a black background. The reflection colour disappears on changing into the focally conical, scattering or homeotropic, transparent state. However, SSCT displays with backlighting have also been described in the prior art.

In addition, SSCT and PSCT displays are bistable, i.e. the alignment state achieved in each case by the LC medium is retained after the electric field has been switched off and is only converted back into the initial state by application of a fresh field. In order to produce a pixel, a short voltage pulse is therefore sufficient. In contrast to this, the LC medium in an addressed pixel in TN or STN displays, for example, immediately returns to its initial state after the electric field has been switched off, meaning that the addressing voltage must be maintained for durable production of a pixel.

For the above-mentioned reasons, CLC displays have significantly lower power consumption compared with TN or STN displays. In addition, they exhibit only slight viewing-angle dependence, or none at all, in the scattering state.

SSCT and PSCT displays can be operated as transmissive or reflective displays, with active-matrix addressing or in multiplex or passive-matrix mode.

U.S. Pat. No. 5,453,863 describes, for example, an SSCT display containing a polymer-free CLC medium having positive dielectric anisotropy. WO 92/19695 and U.S. Pat. No. 5,384,067 describe, for example, a PSCT display containing a CLC medium having positive dielectric anisotropy and up to 10% by weight of a phase-separated polymer network dispersed in the liquid-crystal material.

Further displays disclosed in the prior art in which CLC materials are used are the so-called flexoelectric displays, in particular those operated in "uniformly lying helix mode" (ULH mode). The flexoelectric effect and CLC materials which exhibit this effect have been described, for example, by Chandrasekhar in "Liquid Crystals", 2nd Edition, Cambridge University Press (1992), P. G. deGennes et al. in "The Physics of Liquid Crystals", 2nd Edition, Oxford Science Publications (1995), Patel and Meyer, Phys. Rev. Lett. 58 (15), 1538-1540 (1987) and Rudquist et al., Liq. Cryst. 22 (4), 445-449 (1997).

Flexoelectric CLC materials typically have an asymmetrical molecular structure and a strong dipole moment. On application of an electric field perpendicular to the cholesteric helix axis, the permanent dipoles are aligned in the direction of the field. At the same time, the LC director is distorted owing to the asymmetrical molecular structure, while the alignment of the cholesteric helix axis remains unchanged. This results in macroscopic polarisation of the CLC material in the field direction and in a shift of the optical axis relative to the helix axis.

Flexoelectric displays are usually operated in so-called "uniformly lying helix" (ULH) mode, as described, for example, in P. Rudquist et al., Liq. Cryst. 23 (4), 503 (1997). To this end, a layer of a flexoelectric CLC material having high twist and short helical pitch, typically in the range from 0.2 µm to 1.0 µm, in particular less than 0.5 µm, between two transparent parallel electrodes is aligned in such a way that the cholesteric helix axis is aligned parallel to the electrodes and the CLC layer has a macroscopically uniform alignment. On application of an electric field to the cell perpendicular to the CLC layer, the LC director and thus the optical axis of the sample rotate in the layer plane. If the CLC layer is introduced between two linear polarisers, this results in a change in the transmission of linear-polarised light in the CLC material, which can be utilised in electro-optical displays. The flexoelectric effect is distinguished, inter alia, by very fast response times, typically 6 µs to 100 µs, and by good contrast with a large number of grey shades.

Flexoelectric displays can be operated as transmissive or reflective displays, with active-matrix addressing or in multiplex or passive-matrix mode.

CLC materials having high twist for use in flexoelectric displays are described, for example, in EP 0 971 016 and GB 2,356,629. EP 0 971 016 proposes for this purpose chiral liquid-crystalline estradiol derivatives, and GB 2,356,629 proposes so-called bimesogenic compounds containing two mesogenic groups connected by flexible hydrocarbon chains in combination with chiral dopants.

CLC media for the above-mentioned applications, such as SSCT, PSCT and flexoelectric displays, are usually prepared by doping a nematic LC mixture with a chiral dopant having a high twisting power. The pitch p of the induced cholesteric helix is given by the concentration c and the helical twisting power HTP of the chiral dopant in accordance with equation (3):

$$p = (HTP \cdot c)^{-1} \quad (3)$$

It is also possible to use two or more dopants, for example in order to compensate for the temperature dependence of the HTP of the individual dopants and thus to achieve low temperature dependence of the helical pitch and thus of the reflection wavelength of the CLC medium.

For use in media for CLC displays, the chiral dopants should have the highest possible helical twisting power and low temperature dependence, high stability and good solubility in the liquid-crystalline host phase. In addition, they should have as little adverse effect as possible on the liquid-crystalline and electro-optical properties of the host phase. A high helical twisting power of the dopants is desired, inter alia for achieving small pitches, for example in cholesteric displays, but also in order to be able to reduce the concentration of the dopant. This achieves firstly a reduction in potential impairment of the properties of the LC medium by the dopant and secondly increases the latitude regarding the solubility of the dopant, also enabling, for example, dopants of low solubility to be used.

For use in flexoelectric displays, CLC materials should additionally have a sufficiently strong flexoelectric effect.

In general, CLC materials for use in the above-mentioned displays must have good chemical and thermal stability and good stability to electric fields and electromagnetic radiation. Furthermore, they should have a broad cholesteric liquid-crystal phase having a high clearing point and, depending on the display type, suitable values of the birefringence and dielectric anisotropy and low rotational viscosity.

The CLC materials should in addition be of such a nature that different reflection wavelengths, in particular in the visible region, can be achieved by simple and targeted variation. Furthermore, they should have low temperature dependence of the reflection wavelength. Since liquid crystals are generally used in the form of mixtures of a plurality of components, it is also important that the components are readily miscible with one another.

However, it is not possible to achieve favourable values for all the above-mentioned parameters using the media available from the prior art.

Thus, EP 0 450 025, for example, describes a cholesteric LC mixture consisting of a nematic mixture and two or more chiral dopants. US 2001/0004108 describes a cholesteric LC mixture consisting of a nematic component comprising one or more difluorostilbene compounds containing fluorinated phenyl rings and one or more dopants. However, the mixtures disclosed in EP 0 450 025 have only low clearing points and comprise a high proportion of 26% of chiral dopants. The mixtures specifically disclosed in US 2001/0004108 likewise comprise a high proportion of greater than 20% of chiral dopants. However, a high concentration of the dopant generally result in an impairment of the liquid-crystalline and electro-optical properties of the CLC medium.

The materials known from the prior art for flexoelectric and CLC displays often do not have sufficiently broad LC phases, sufficiently low viscosity values or sufficiently high values of the dielectric anisotropy. In addition, they require high switching voltages and often do not have birefringence values matched to the requisite LC layer thickness.

Thus, for example for many CLC displays, a CLC medium having high birefringence $\Delta n$ is necessary in order to achieve high reflectivity, while other CLC displays, for example displays whose priority is high colour saturation (multicolour CLC displays), require a low value of $\Delta n$. However, it has been found that a lowering of the birefringence while simultaneously retaining the high polarity of the CLC medium which is necessary for low switching voltages cannot be achieved to an adequate extent using the CLC media known from the prior art.

There is thus a great demand for CLC media having high twist, a large working-temperature range, short response times, a low threshold voltage, low temperature dependence of the reflection wavelength and a broad LC phase having a high clearing point which do not have the disadvantages of the media known from the prior art, or only do so to a lesser extent.

A further aspect of the invention relates to the provision of CLC media for CLC displays having active-matrix addressing.

As mentioned above, CLC displays, such as, for example, SSCT or flexoelectric displays, can be operated with active-matrix addressing or with multiplex or passive-matrix addressing. Active-matrix displays (AM displays) contain integrated nonlinear elements for individual addressing and switching of individual pixels. Nonlinear elements which can be used are, for example, active elements (i.e. transistors). The term "active matrix" is therefore used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins. In the case of the more promising type 2, which is preferred, the electro-optical effect used is usually the TN. effect. A distinction is made between two technologies: TFTs comprising compound semiconductors, such as, for example, CdSe, or TFTs based on polycrystalline or amorphous silicon. Intensive work is being carried out world-wide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term AM displays here encompasses any matrix display with integrated non-linear elements, i.e., besides the active matrix, also displays having passive elements, such as varistors or diodes (MIM=metal-insulator-metal).

AM displays are particularly suitable for TV applications (for example pocket television sets) or for high-information displays for computer applications (laptops) and in automobile or aircraft construction.

AM displays generally require LC media having large positive dielectric anisotropy, broad LC phases, relatively low birefringence, very high specific resistance, good UV and temperature stability and low vapour pressure.

However, it has been found that the CLC media known from the prior art often do not meet these requirements or only do so to an inadequate extent. Thus, the known CLC media often exhibit inadequately high specific resistance. With decreasing resistance, however, the contrast of an AM display worsens, and the problem of after-image elimination can occur. Since the specific resistance of the LC mixture generally decreases over the life of an AM display due to interaction with the inner surfaces of the display, a high (initial) resistance is very important in order to obtain acceptable service lives. It is furthermore important that the specific resistance exhibits the lowest possible increase with increasing temperature and after heating and/or exposure to UV. CLC media known from the prior art often also exhibit disadvantageous low-temperature properties. It is required that no crystallisation and/or smectic phases occur, even at low temperatures, and the temperature dependence of the viscosity is as low as possible.

There thus continues to be a great demand for CLC media for AM-CLC displays having very high specific resistance at the same time as a broad working-temperature range, short response times, even at low temperatures, and a low threshold voltage which do not exhibit the above-mentioned disadvantages, or only do so to a lesser extent.

A further aspect of the invention relates to the use of CLC media in non-linear optics (NLO) and laser optics, in particular in laser arrangements.

The use of CLC materials in lasers is known from the prior art. DE 196 27 350 describes, for example, a laser arrangement having an active laser material and a resonator, where the resonator contains helically birefringent mirrors consisting of a CLC material. In addition, CLC materials have also been proposed as active material for use in lasers without mirrors, for example in pure form or with addition of dyes, such as fluorescent or phosphorescent dyes. U.S. Pat. No. 3,771,065 describes, for example, a laser containing a liquid laser medium consisting of a CLC mixture and a fluorescent dye.

Owing to their periodic structure, CLCs can act as one-dimensionally photonic band-gap materials which exhibit reflection of circular-polarised light, whose reflection band depends on the birefringence of the CLC, and whose direction of rotation corresponds to that of the cholesteric helix. If the CLC material is excited, usually in the UV region, and the emission wavelength corresponds to the reflection wavelength of the cholesteric helix, "self-lasing" can occur due to a feedback process. The emission is increased at the edges of the reflection band. In particular in dye-doped CLC media, low lasing thresholds and high yields have been observed. In doped systems, the energy transfer from the chiral CLC material to the active (dye) material is of particularly great importance for the laser properties.

More recent publications, such as, for example, E. Yablanovitch, Phys. Rev. Lett. 58(20), 2059 (1987), J. Dowling, M. Scalora, M. Bloemer, M. Bowden, J. Appl. Phys. 75(4), 1896 (1994), V. Kopp, B. Fan, H. Vithana, A. Genack, Optics Letters 23(21), 1707 (1998) and P. Palffy-Muhoray, A. Munoz, B. Taheri, R. Twieg, SID Digest, 1170 (2000), describe, inter alia, the effect of the fluorescence spectrum and the structure of the dye and its orientation in the CLC host phase on the laser properties. However, the influence of the physical properties of the CLC medium on the laser properties has hitherto not been investigated in detail in the prior art.

However, it has been found that the laser properties of low-molecular-weight CLC materials are impaired by the occurrence of defects in the cholesteric phase structure formed by the heat dissipated during the laser process. Thus, for example, heat dissipation owing to the temperature dependence of the cholesteric helical pitch can cause a local change in the pitch and thus a defect in the cholesteric phase structure.

There thus continues to be a great demand for CLC media for use in lasers, in particular as host phase for dyes, such as fluorescent dyes, which facilitate low lasing thresholds and high laser efficiency. The CLC materials should, in particular, facilitate specific setting of the reflection band and matching thereof to the emission wavelength of the active (dye) material in the laser in order to achieve optimisation of the energy-transfer process from the CLC material to the active material. In addition, the CLC materials should have a broad cholesteric phase, a low crystalline-cholesteric or smectic-cholesteric phase-transition temperature, a high clearing point, suitable birefringence, and low temperature dependence of the reflection wavelength. Furthermore, the CLC materials should have low absorption in the region of the excitation wavelength of the laser material in order to facilitate improved laser efficiency.

The invention has the object of providing CLC media, in particular for use in flexoelectric, SSCT and PSCT displays and other bistable CLC displays, in active-matrix CLC displays, and in lasers which have the above-mentioned required properties and do not have the disadvantages of the media known from the prior art, or only do so to a small extent.

It has been found that this object can be achieved by the provision of media according to the invention.

The invention relates to a liquid-crystalline medium having a helically twisted structure comprising a nematic component and an optically active component, characterised in that the optically active component comprises one or more chiral compounds whose helical twisting power and concentration are selected in such a way that the helical pitch of the medium is $\leq 1$ µm, and the nematic component comprises one or more compounds containing a 3,4,5-trifluorophenyl group.

The invention furthermore relates to a liquid-crystalline medium having a helically twisted structure comprising a nematic component and an optically active component, characterised in that the optically active component comprises one or more chiral compounds whose helical twisting power and concentration are selected in such a way that the helical pitch of the medium is $\leq 1$ µm, and the nematic component comprises one or more compounds of the formula I

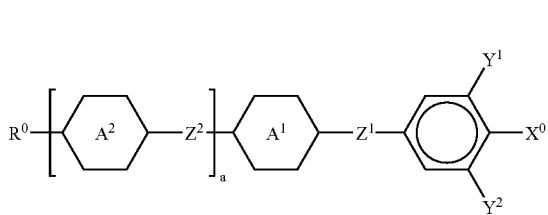

in which
R⁰ denotes H or an alkyl or alkenyl radical having 1 to 20 C atoms which is unsubstituted, monosubstituted by CN or CF$_3$ or at least monosubstituted by halogen, where, in addition, one or more CH$_2$ groups in these radicals may each, independently of one another, be replaced by —O—, —S—, —CO—, —CO—O—, —O—CO—, —O—CO—O—, —CH=CH— or —C≡C— in such a way that O atoms are not linked directly to one another,

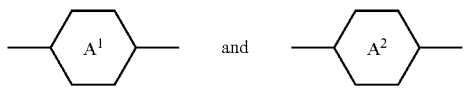

each, independently of one another, denote

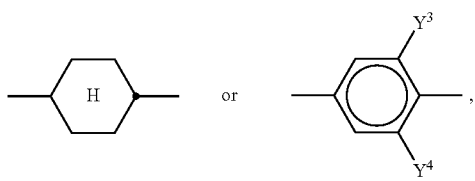

Y¹ to Y⁴ each, independently of one another, denote H or F,
Z¹ and Z² each, independently of one another, denote —O—, —S—, —CO—, —COO—, —OCO—, —S—CO—, —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C— or a single bond,
X⁰ denotes F, Cl, halogenated alkyl, alkenyl or alkoxy having 1 to 6 C atoms, and
a denotes 0 or 1.

The invention furthermore relates to the use of the CLC media according to the invention for electro-optical, laser-optical and nonlinear-optical purposes, in particular in bistable CLC displays, SSCT, PSCT and flexoelectric displays, in particular those having active-matrix addressing, and in lasers.

The invention furthermore relates to an electro-optical display, in particular a bistable, CLC, SSCT, PSCT or flexoelectric display, having two plane-parallel outer plates, which, together with a frame, form a cell, and a CLC medium located in the cell, where the CLC medium is a medium according to the invention, and the display is preferably operated with active-matrix addressing.

The invention furthermore relates to a laser or laser arrangement, preferably without mirrors, containing a CLC medium according to the invention and optionally one or more dyes, such as, for example, fluorescent dyes, as resonator and/or active laser material.

The invention furthermore relates to an active laser material or a resonator for laser applications, containing a CLC medium according to the invention and optionally one or more dyes, such as, for example, fluorescent dyes.

The invention furthermore relates to a liquid-crystalline medium having a helically twisted structure comprising a nematic component and an optically active component, in particular a medium as described above and below, characterised in that the optically active component comprises one or more chiral compounds whose helical twisting power and concentration are selected in such a way that the helical pitch of the medium is ≦1 μm, and the medium exhibits no or negligible absorption at a wavelength of 355 nm or more.

The term "negligible absorption" means that the medium according to the invention has a transmission of greater than 95%, i.e. an absorption of 5% or less, in the defined wavelength range. Particular preference is given to media in which the absorption in the defined wavelength range is 3% or less, in particular 1.5% or less, particularly preferably 1% or less, very particularly preferably 0.5% or less.

The CLC media according to the invention enable a significant broadening of the available parameter latitude. The achievable combinations of clearing point, viscosity at low temperature, thermal and UV stability and dielectric anisotropy far exceed previous materials from the prior art.

The mixtures according to the invention are distinguished, in particular, by the following advantages:
they have a broad cholesteric phase range, in particular at low temperatures, and a high clearing point,
they have low temperature dependence of the reflection wavelength,
they have low UV absorption and high UV stability.

Surprisingly, it has been found, in particular, that it is possible to provide a CLC medium corresponding to the present invention having a reflection wavelength in the visible region and a cholesteric phase at room temperature which has a high value of the dielectric anisotropy Δε and at the same time high specific resistance. This is achieved in the CLC media according to the invention by, in particular, the use of compounds of the formula I together with chiral dopants of high twisting power as described below. The CLC media according to the invention also exhibit excellent properties with respect to colour saturation and UV stability on use in CLC displays.

In addition, it has been found that the CLC media according to the invention are highly suitable for use in lasers, for example as helically birefringent mirrors, but in particular in the active laser material as host phase for dyes, such as, for example, fluorescent dyes. The reflection band in the media according to the invention can be set specifically over a broad wavelength range and thus matched to the emission wavelength of the dye, which enables optimisation of the energy-transfer process from the CLC host medium to the active material. In addition, the media according to the invention have low temperature dependence of the reflection wavelength and can easily be oriented into a uniform planar cholesteric structure, reducing the occurrence of defect structures during lasing and increasing the laser efficiency.

In particular, the CLC media according to the invention exhibit significantly reduced UV absorption and significantly improved UV stability compared with the materials known from the prior art, with the other parameters desired or necessary generally not only not being impaired, but likewise being significantly improved.

Thus, in liquid-crystalline mixtures which include the CLC medium according to the invention, a smaller reduction in the voltage holding ratio (VHR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] after UV irradiation is observed than in conventional mixtures. A comparable situation also applies to the change in the specific resistance (SR) of the mixtures as a consequence of UV treatment: LC mixtures and LC displays which contain the CLC medium according to the invention have, after UV treatment, significantly higher specific resistance and prove to be less radiation-sensitive than mixtures without a medium according to the invention.

On use in a laser medium, the reduced UV absorption of the CLC media according to the invention facilitates a significant increase in the laser efficiency since the radiation used for excitation of the active material, which is typically in the UV region, is not absorbed by the CLC host material, or is absorbed to a lesser extent. In particular at a wavelength in the region of 355 nm, which corresponds to a typical excitation wavelength of active material in laser arrangements, the absorption of CLC media according to the invention is significantly reduced.

Particular preference is given to CLC media in which the nematic component comprises more than 20%, in particular more than 40%, particularly preferably more than 50%, of one or more compounds containing a 3,4,5-trifluorophenyl group. Preference is furthermore given to CLC media in which the nematic component comprises at least 60%, in particular at least 75%, of one or more compounds containing a 3,4,5-trifluorophenyl group.

Preference is furthermore given to CLC media comprising at least one compound of the formula I in which $X^0$, $Y^1$ and $Y^2$ denote F, and media comprising at least one compound of the formula I in which $X^0$ denotes Cl, $CF_3$, $OCF_3$ or $OCHF_2$.

Particular preference is given to compounds of the formula I in which $Z^1$ and $Z^2$ preferably denote —O—, —S—, —CO—, —COO—, —OCO—, —S—CO—; —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$— or a single bond, in particular —COO—, —OCO—, —OCH$_2$—, —CH$_2$O—, —CF$_2$O—, —OCF$_2$—, —CH$_2$CH$_2$—, —CF$_2$CH$_2$—, —CH$_2$CF$_2$—, —CF$_2$CF$_2$— or a single bond.

In general, compounds containing a 3,4,5-trifluorophenyl group which is linked to a further phenyl group via a bridging unit —CH═CH—, —CF═CH—, —CH═CF—, —CF═CF— or —C═C—, in particular —CF═CF—, are less preferred for use in CLC media according to the invention, in particular for CLC displays according to the invention.

Furthermore, CLC media comprising a compound of the formula I in which $R^0$ denotes alkyl having 1 to 10 C atoms or alkenyl having 2 to 20 C atoms, a denotes 0 or 1, $A^1$ denotes 1,4-phenylene, $A^2$ denotes 1,4-cyclohexylene, $X^0$ denotes F, Cl or CN, $Z^1$ denotes CF═CF and $Z^2$ denotes a single bond are, in particular, less preferred for use in CLC displays.

The compounds of the formulae I have a broad range of applications. Depending on the choice of substituents, these compounds can serve as base materials of which liquid-crystalline media are predominantly composed; however, it is also possible to add compounds of the formulae I to liquid-crystalline base materials from other classes of compound in order, for example, to influence the dielectric and/or optical anisotropy of a dielectric of this type and/or to optimise its threshold voltage and/or its viscosity. In the pure state, the compounds of the formulae I are colourless and form liquid-crystalline mesophases in a temperature range which is favourably located for electro-optical use. They are stable chemically, thermally and to light.

The compounds of the formula I are preferably selected from the following formulae

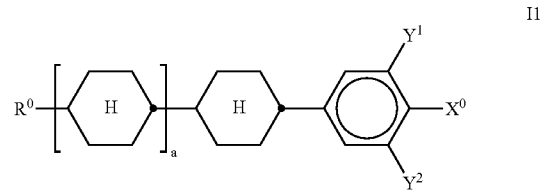

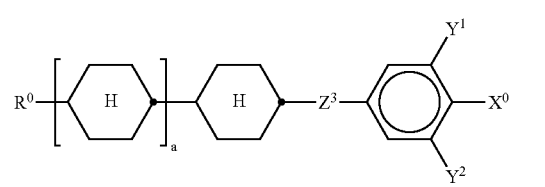

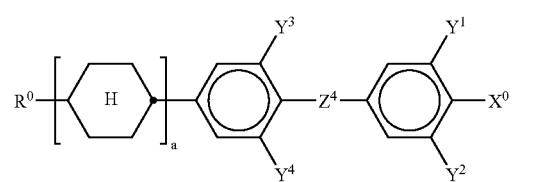

in which $R^0$, $X^0$, $Y^1$, $Y^2$, $Y^3$, $Y^4$ and a have the meaning indicated in the formula I, $R^0$ preferably denotes n-alkyl, alkoxy, fluoroalkyl, alkenyl or oxaalkenyl, each having up to 9 C atoms, $Z^3$ in each case, independently of one another, denotes COO, $C_2H_4$, $CF_2O$ or $C_2F_4$, and $Z^4$ in each case, independently of one another, denotes COO, $CF_2O$, $C_2F_4$ or a single bond.

The compounds of the formula I1 are preferably selected from the following group

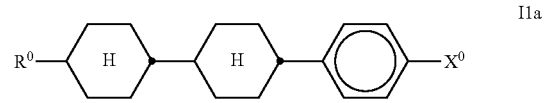

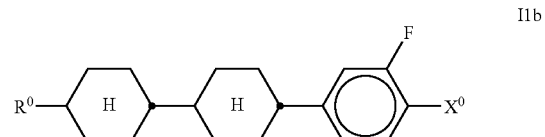

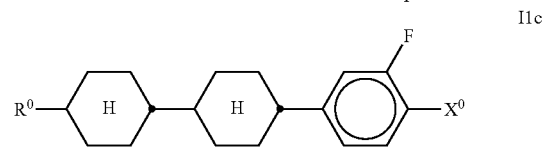

-continued

I1d
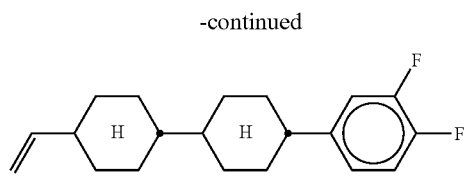

I1e
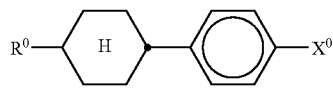

I1f
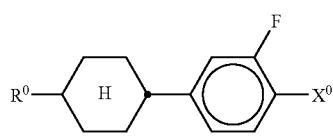

I1g
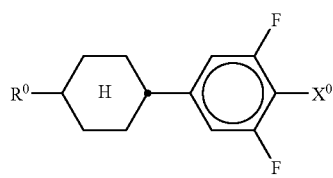

in which R⁰ and X⁰ have the meaning indicated in the formula I, R⁰ particularly preferably denotes n-alkyl having 1 to 8 C atoms or alkenyl having 2 to 7 C atoms, and X⁰ particularly preferably denotes F, Cl, $CF_3$, $OCF_3$ or $OCHF_2$. Particular preference is given to compounds of the formula I1a, in particular those in which X⁰ denotes $OCF_3$, and compounds of the formula I1b, in particular those in which X⁰ denotes F.

The compounds of the formula I2 are preferably selected from the following group I2a
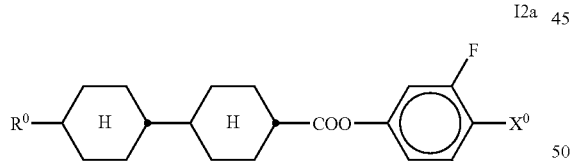

I2b
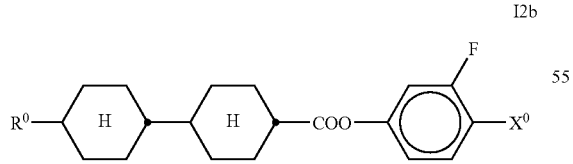

I2c
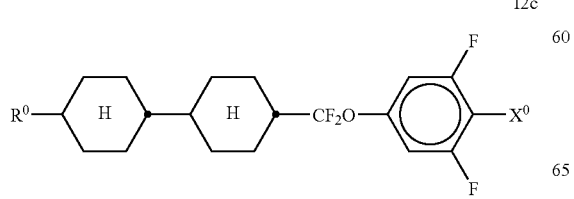

I2d
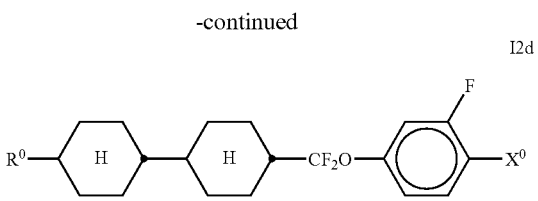
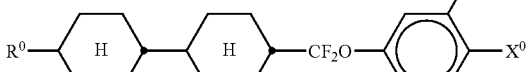

I2e
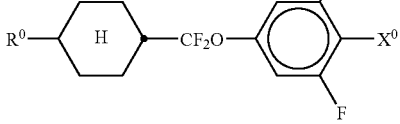

I2f
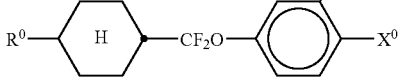

I2g
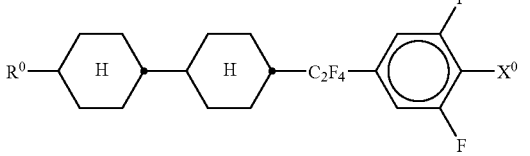

I2h
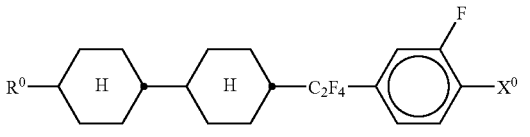

I2i
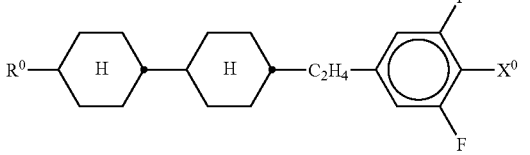

I2k
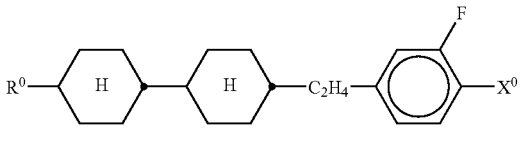

in which R⁰ and X⁰ have the meaning indicated in the formula I, R⁰ particularly preferably denotes n-alkyl having 1 to 8 C atoms or alkenyl having 2 to 7 C atoms, and X⁰ preferably denotes $OCF_3$ or F, particularly preferably F. Particular preference is given to compounds of the formulae I2a, I2b and I2c, furthermore I2i and I2k, in particular those in which X⁰ denotes F.

The compounds of the formula I3 are preferably selected from the following group

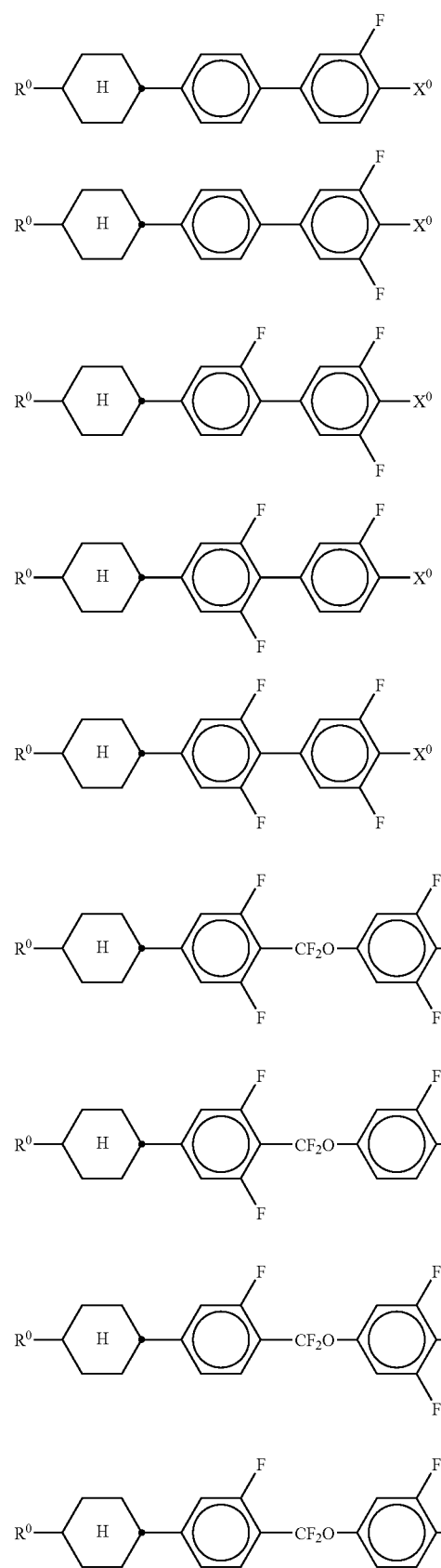
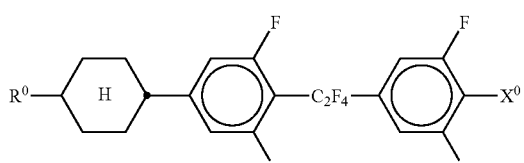
in which $R^0$ and $X^0$ have the meaning indicated in the formula I, $R^0$ particularly preferably denotes n-alkyl having 1 to 8 C atoms or alkenyl having 2 to 7 C atoms, and $X^0$ preferably denotes $OCF_3$ or F, particularly preferably F. Particular preference is given to compounds of the formulae I3a, I3b and I3c, in particular those in which $X^0$ denotes F.

In a further preferred embodiment, the medium additionally comprises one or more compounds selected from the following formulae

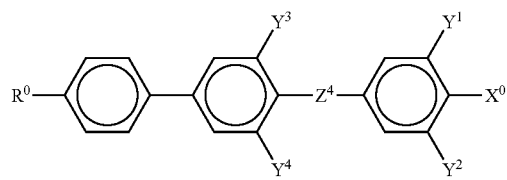

I4

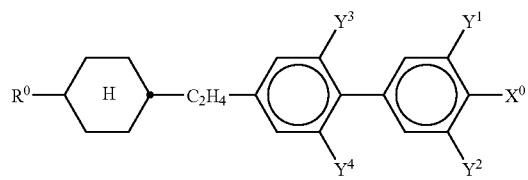

I5

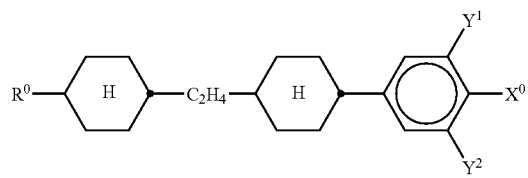

I6 in which $R^0$, $Z^4$, $X^0$, $Y^1$, $Y^2$, $Y^3$ and $Y^4$ have the meaning indicated in the formula I.

The compounds of the formula I4 are preferably selected from the following group I4a I4b I4c -continued

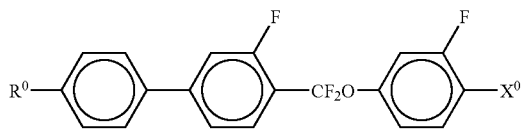

I4d

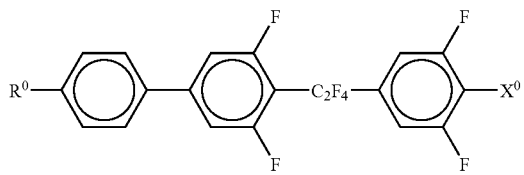

I4e

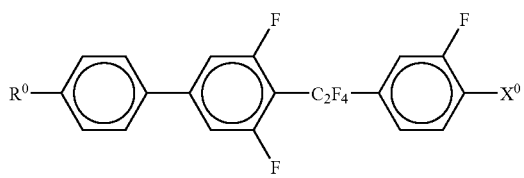

I4f

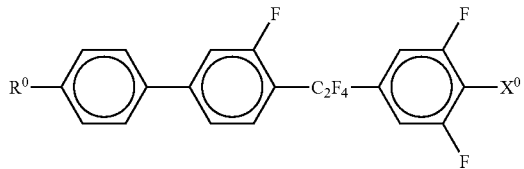

I4g

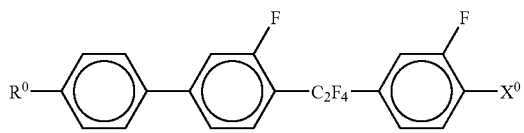

I4h

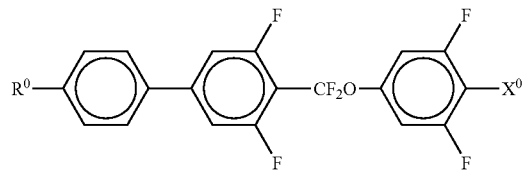

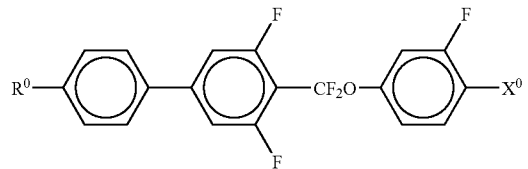

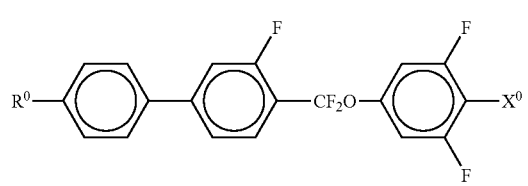

in which $R^0$ and $X^0$ have the meaning indicated above, and $R^0$ particularly preferably denotes n-alkyl having 1 to 8 C atoms or alkenyl having 2 to 7 C atoms, and $X^0$ preferably denotes $OCF_3$ or F, particularly preferably F. Particular preference is given to compounds of the formulae I4a and I4b, in particular those in which $X^0$ denotes F.

In a further preferred embodiment, the medium additionally comprises one or more compounds selected from the following group

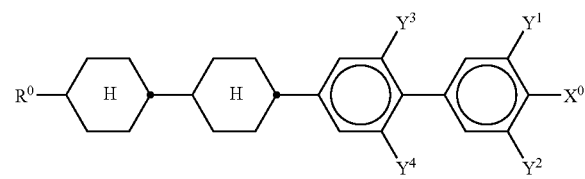

II

-continued

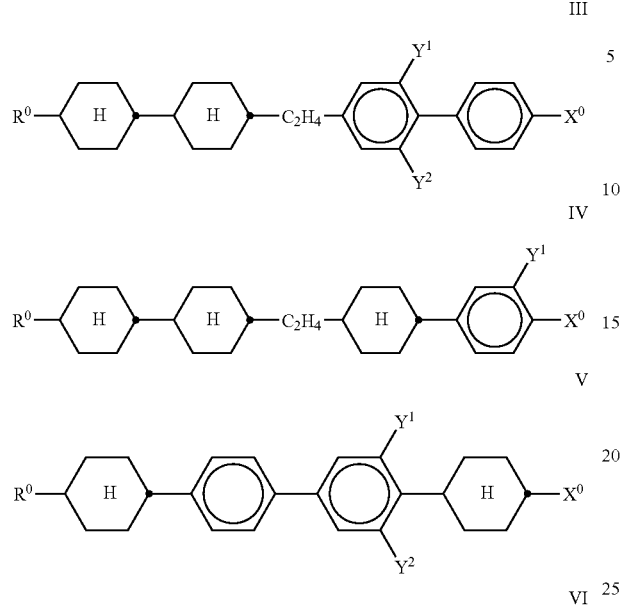

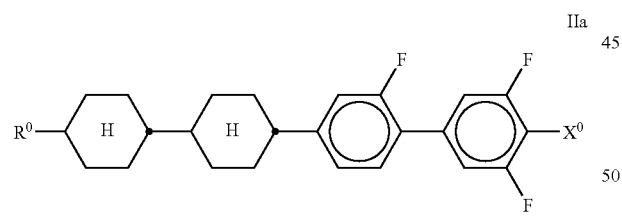

in which $R^0$, $X^0$, $Y^1$, $Y^2$, $Y^3$ and $Y^4$ have the meaning indicated in the formula I, $X^0$ preferably denotes F, Cl, $CF_3$, $OCF_3$ or $OCHF_2$, and $X^0$ may additionally also denote alkyl, oxaalkyl, fluoroalkyl or alkenyl, in each case having 1 to 6 C atoms.

Particular preference is given to compounds of the formula IIa

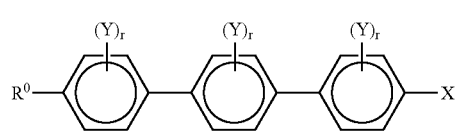

in which $R^0$ and $X^0$ have the meaning indicated above, and $X^0$ preferably denotes F.

In a further preferred embodiment, the medium additionally comprises one or more compounds selected from the following group

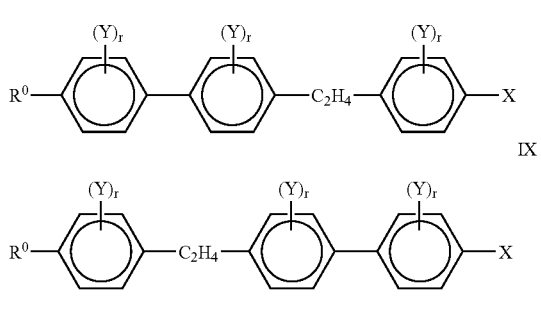

in which $R^0$ has the meanings indicated in the formula I, X has one of the meanings indicated for $X^0$ in the formula I or denotes alkyl, oxaalkyl, fluoroalkyl or alkenyl, each having 1 to 6 C atoms, Y denotes H, F, CN or Cl, and r denotes 0, 1, 2, 3 or 4. The 1,4-phenylene rings are preferably monosubstituted or polysubstituted by fluorine atoms.

The compounds are particularly preferably selected from the following group

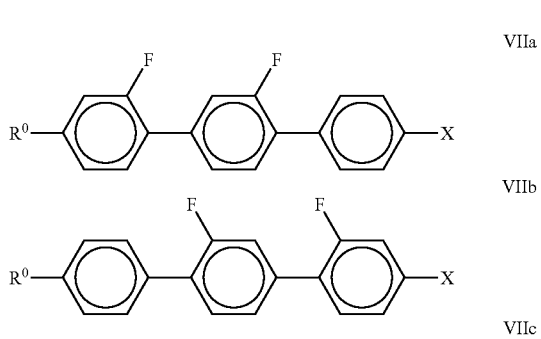

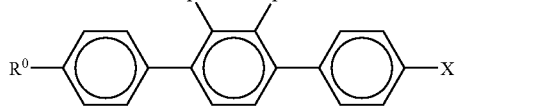

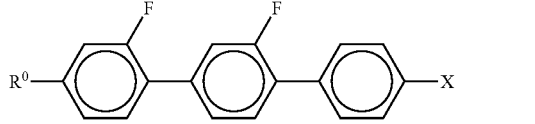

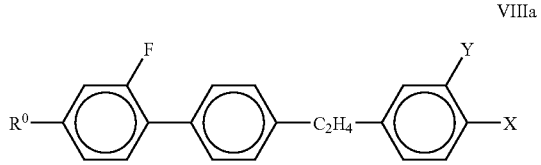

in which $R^0$ and X have the meaning indicated above, Y denotes H or F, preferably F, $R^0$ particularly preferably denotes n-alkyl having 1 to 8 C atoms or alkenyl having 2 to 7 C atoms, and X in the formula VIIa, VIIb and VIIIa preferably denotes F or Cl and in the formula VIIc and VIId preferably denotes alkyl or alkoxy having 1 to 6 C atoms.

In a further preferred embodiment, the medium additionally comprises one or more compounds selected from the following group

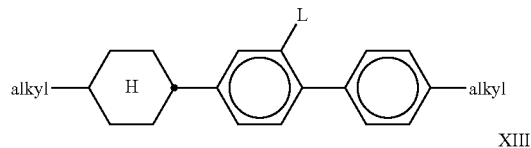
X

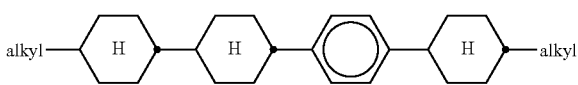
XI

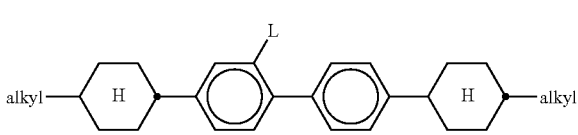
XII

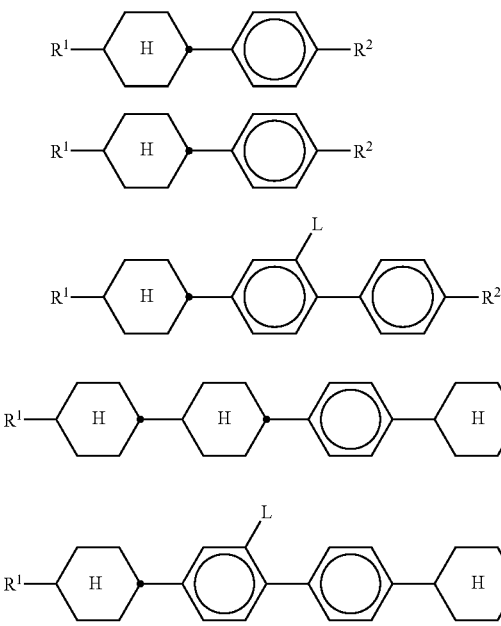

XIII

XIV in which R¹ and R² each, independently of one another, denote alkyl or alkoxy having 1 to 8 C atoms or alkenyl having 2 to 7 C atoms, and L denotes H or F. In the compounds of the formula XI, XII and XIII, R¹ and R² preferably denote alkyl or alkoxy having 1 to 8 C atoms.

The compounds are particularly preferably selected from the following group:

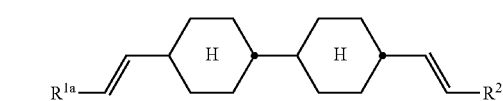
Xa

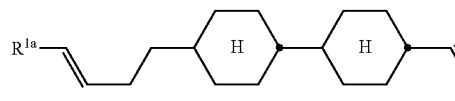
Xb

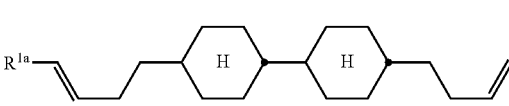
Xc

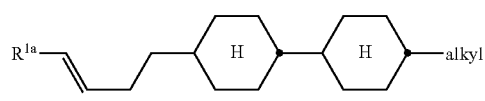
Xd

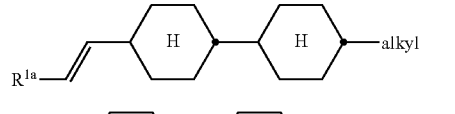
Xe

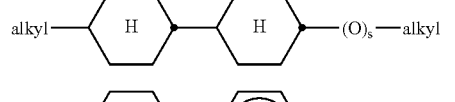
Xf

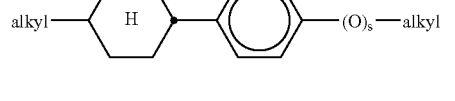
XIa

-continued

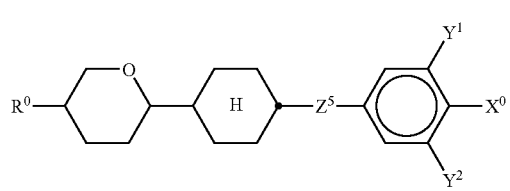
XIIa

XIIIa

XIVa in which $R^{1a}$ and $R^{2a}$ each, independently of one another, denote H, $CH_3$, $C_2H_5$ or n-$C_3H_7$, alkyl denotes an alkyl group having 1 to 7 C atoms, s denotes 0 or 1, and L denotes H or F.

In a further preferred embodiment, the medium additionally comprises one or more compounds of the following formula

XXI

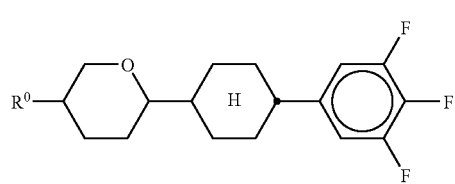

in which $R^0$, $X^0$, $Y^1$ and $Y^2$ have the meaning indicated in the formula I, $R^0$ preferably denotes n-alkyl, alkoxy, fluoroalkyl, alkenyl or oxaalkenyl, each having up to (C atoms, $Z^5$ denotes $CF_2O$, $C_2F_4$ or a single bond.

The compounds are particularly preferably selected from the following group:

XXI1

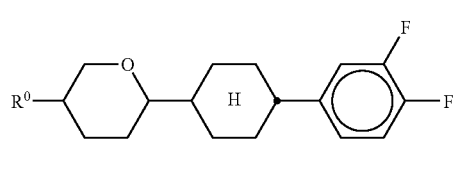

XXI2

XXI3

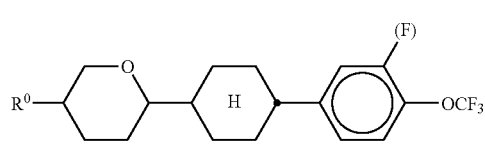

-continued

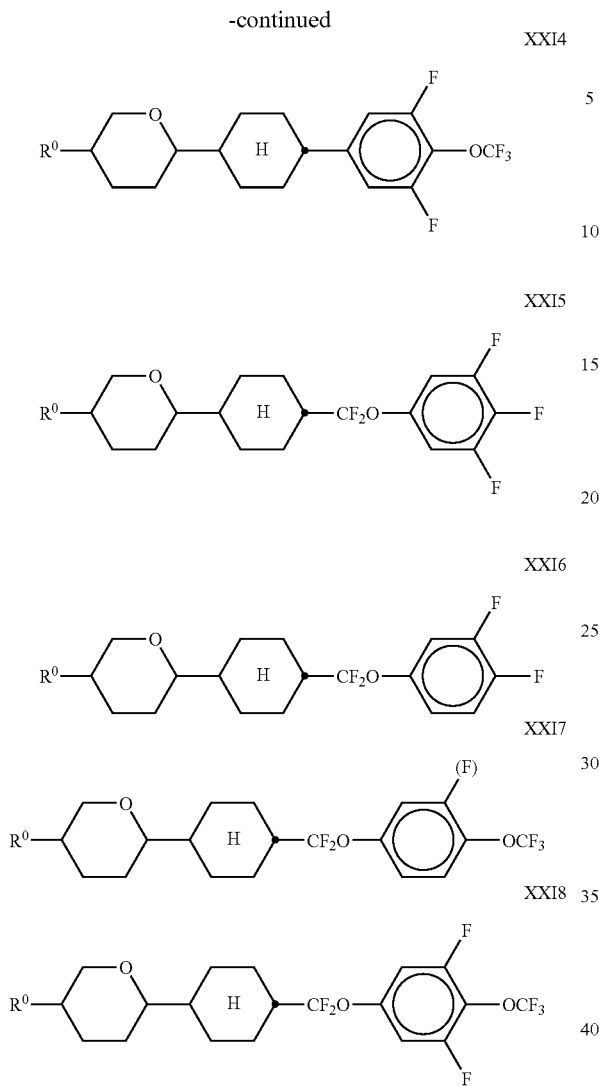

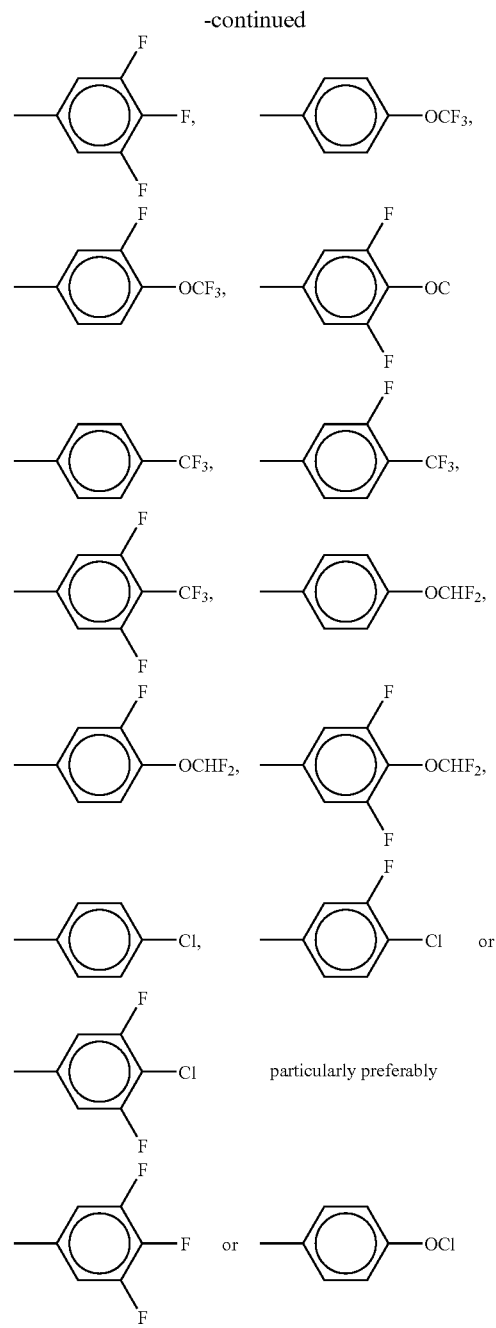

in which $R^0$ has the meaning indicated above, preferably denotes alkyl or alkoxy having 1 to 8 C atoms, and (F) denotes H or F. Very particular preference is given to compounds of the formula XXI1 and XXI8.

The compounds of the formula VII and XIII are preferably selected in such a way that they have no or negligible absorption at a wavelength of 355 or more.

In the formulae mentioned above and below, the group

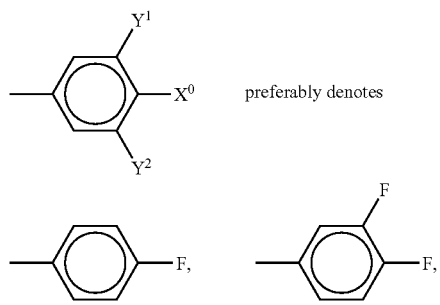

preferably denotes

The optically active component comprises one or more chiral dopants whose helical twisting power and concentration are selected in such a way that the helical pitch of the LC medium is less than or equal to 1 μm.

The helical pitch of the medium is preferably 130 to 1000 nm, in particular 200 to 750 nm, particularly preferably 300 to 450 nm.

The helical pitch is preferably selected in such a way that the medium reflects light in the visible wavelength region. The term "visible wavelength region" or "visible spectrum" typically covers the wavelength range from 400 to 800 nm. Above and below, however, this term is also intended to include the wavelength range from 200 to 1200 nm, including the UV and infrared (IR) region, and the far UV and far IR region.

The reflection wavelength of the LC medium according to the invention is preferably in the range from 200 to 1500 nm, in particular from 300 to 1200 nm, particularly preferably from 350 to 900 nm, very particularly preferably from 400 to 800 nm. Preference is furthermore given to LC media having a reflection wavelength of 400 to 700 nm, in particular 400 to 600 nm.

The wavelength values indicated above and below relate to the half-value width of the reflection band, unless stated otherwise.

The ratio d/p between the layer thickness of the liquid-crystal cell d (separation of the outer plates) in a CLC display according to the invention and the natural helical pitch p of the LC medium is preferably greater than 1, in particular in the range from 2 to 20, particularly preferably from 3 to 15, very particularly preferably from 4 to 10.

The proportion of the optically active component in the LC medium according to the invention is preferably <20%, in particular <10%, particularly preferably 0.01 to 7%, very particularly preferably 0.1 to 5%. The optically active component preferably comprises 1 to 6, in particular 1, 2, 3 or 4, chiral compounds.

The chiral dopants should preferably have a high helical twisting power (HTP) and low temperature dependence. They should furthermore have good solubility in the nematic component and not impair the liquid-crystalline properties of the LC medium, or only do so to a small extent. They can have the same or opposite directions of rotation and the same or opposite temperature dependence of the twist.

Particular preference is given to dopants having an HTP of 20 µm$^{-1}$ or more, in particular 40 µm$^{-1}$ or more, particularly preferably 70 µm$^{-1}$ or more.

For the optically active component, a multiplicity of chiral dopants, some of which are commercially available, is available to the person skilled in the art, such as, for example, cholesteryl nonanoate, R/S-811, R/S-1011, R/S-2011, R/S-3011 or CB15 (Merck KGaA, Darmstadt).

Particularly suitable dopants are compounds which contain one or more chiral radicals and one or more mesogenic groups or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore monovalent or polyvalent chiral radicals selected from the group consisting of sugar derivatives, sugar alcohols, sugar acids, lactic acids, chiral substituted glycols, steroid derivatives, terpene derivatives, amino acids and sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide and isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or -propylene glycols in which one or more $CH_2$ groups are substituted by alkyl or alkoxy; amino acids, such as, for example, alanine, valine, phenylglycine or phenylalanine, or sequences of 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE-A-43 42 280, EP-A-1 038 941 and DE-A-195 41 820.

Particular preference is given to dopants selected from the group consisting of compounds of the following formulae

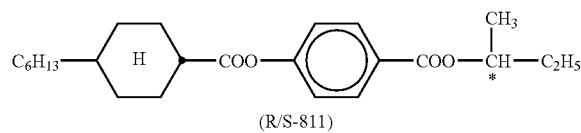

(R/S-811)

XV

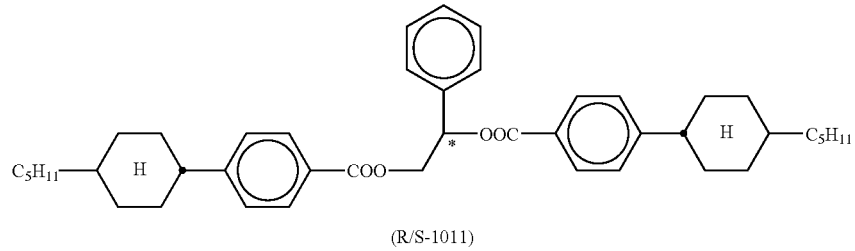

(R/S-1011)

XVI

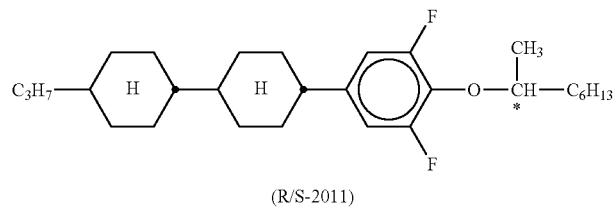

(R/S-2011)

XVII

Further preferred dopants are derivatives of isosorbide, isomannitol or isoiditol of the following formula

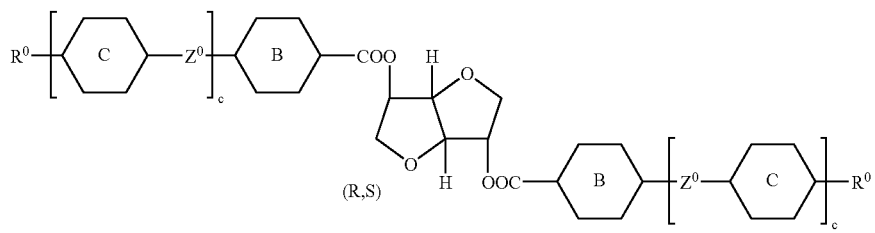

XVIII in which the

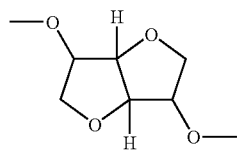

group is

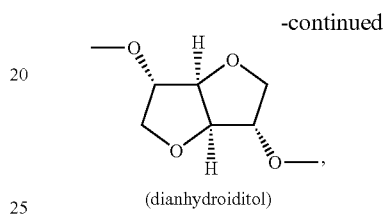

(dianhydroiditol)

preferably dianhydrosorbitol, and chiral ethanediols, such as, for example, diphenylethanediol (hydrobenzoin), in particular mesogenic hydrobenzoin derivatives of the following formula

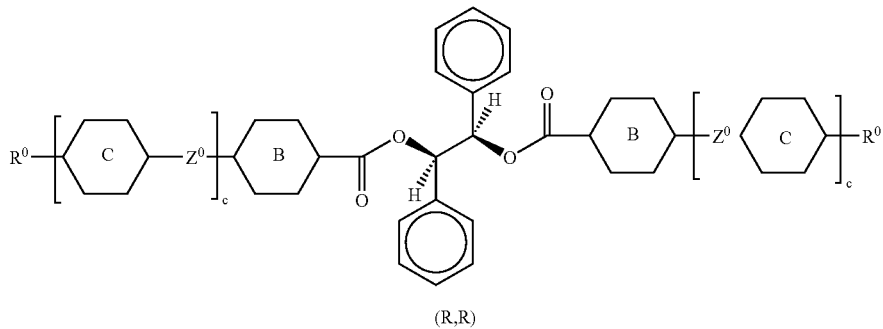

XIX

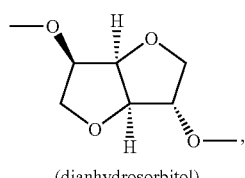
(dianhydrosorbitol)

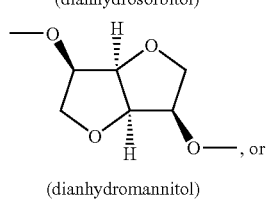
(dianhydromannitol)

including the respective (R,S), (S,R), (R,R) and (S,S) enantiomers which are not shown, in which B and C each, independently of one another, denote 1,4-phenylene, which may also be mono-, di- or trisubstituted by L, or 1,4-cyclohexylene, L denotes H, F, Cl, CN or optionally halogenated alkyl, alkoxy, alkylcarbonyl, alkoxycarbonyl or alkoxycarbonyloxy having 1-7 C atoms, c denotes 0 or 1, $Z^0$ denotes —COO—, —OCO—, —CH$_2$CH$_2$— or a single bond, and $R^0$ denotes alkyl, alkoxy, alkylcarbonyl, alkoxycarbonyl or alkylcarbonyloxy having 1-12 C atoms.

The compounds of the formula XVIII are described in WO 98/00428. The compounds of the formula XIX are described in GB-A-2,328,207.

Very particularly preferred dopants are chiral binaphthyl derivatives, as described in WO 02/94805, chiral binaphthol acetal derivatives, as described in WO 02/34739, chiral TAD-DOL derivatives, as described in WO 02/06265, and chiral dopants having at least one fluorinated bridge group and a terminal or central chiral group, as described in WO 02/06196 and WO 02/06195.

Particular preference is given to chiral binaphthyl derivatives of the formula XX

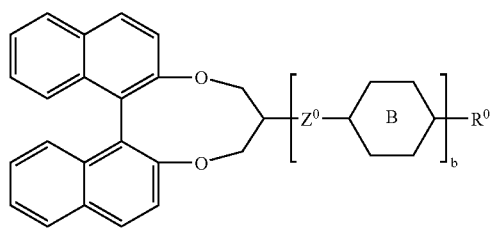

XX in particular those selected from the following formulae

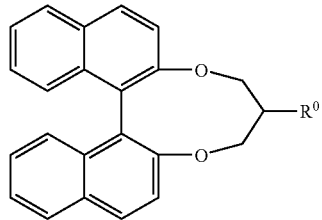

XXa

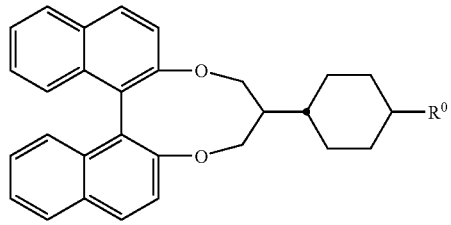

XXb

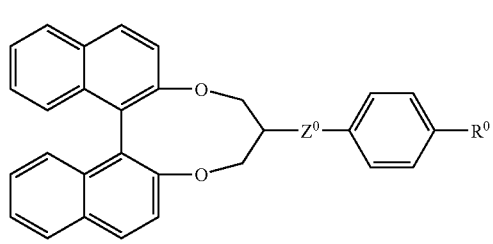

XXc in which B, R⁰ and Z⁰ have the meaning indicated in the formula XVIII, and b denotes 0, 1 or 2, and Z⁰ denotes, in particular, —OCO— or a single bond.

In particular, the dopants of the above-mentioned formulae XVIII, XIX and XX exhibit good solubility in the nematic component and induce a cholesteric structure having high twist and low temperature dependence of the helical pitch and reflection wavelength. Even on use of only one of these dopants in small amounts, it is possible to achieve CLC media according to the invention having reflection colours in the visible wavelength region of high brightness and low temperature dependence which are suitable, in particular, for use in SSCT and PSCT displays.

This is an important advantage over the CLC media from the prior art, in which at least two dopants having the same direction of rotation and opposite temperature dependence of the twist are usually required (for example one dopant having positive temperature dependence, i.e. an increase in twist with increasing temperature, and one dopant having negative temperature dependence) in order to achieve temperature compensation of the reflection wavelength. In addition, large amounts of dopants are frequently required in the known CLC media in order to achieve reflection in the visible region.

A particularly preferred embodiment of the invention therefore relates to a CLC medium and to a CLC display containing this medium, as described above and below, in which the chiral component comprises not more than one chiral compound, preferably in an amount of less than 15%, in particular less than 10%, particularly preferably 5% or less. The chiral compound in these media is particularly preferably selected from the compounds described in EP 01111954.2, WO 02/34739, WO 02/06265, WO 02/06196 and WO 02/06195 and from the compounds of the formulae XVIII, XIX and XX, including preferred sub-formulae thereof. A CLC medium of this preferred embodiment has low dependence of the reflection wavelength k on the temperature T over a broad temperature range.

Particular preference is given to CLC media according to the invention having a temperature dependence $d\lambda/dT$ of 0.6 nm/° C. or less, in particular 0.3 nm/° C. or less, very particularly preferably 0.15 nm/° C. or less, preferably in the range between 0 and 50° C., in particular between −20 and 60° C., particularly preferably between −20 and 70° C., very particularly preferably in the range from −20° C. to a temperature of 10° C., in particular 5° C., below the clearing point.

Unless stated otherwise, $d\lambda/dT$ denotes the local gradient of the function $\lambda(T)$, where a nonlinear function $\lambda(T)$ is described to an approximation by a 2nd or 3rd order polynomial.

A further preferred embodiment relates to a CLC medium according to the invention which comprises one or more compounds containing at least one polymerisable group. CLC media of this type are particularly suitable for use, for example, in polymer gel or PSCT displays. The polymerisable compounds may be a constituent of the nematic and/or chiral component or form an additional component of the medium.

Suitable polymerisable compounds are known to the person skilled in the art and are described in the prior art. The polymerisable compounds may additionally also be mesogenic or liquid-crystalline. They may contain one or more, preferably two, polymerisable groups. Typical examples of non-mesogenic compounds containing two polymerisable groups are alkyl diacrylates or alkyl dimethacrylates containing alkyl groups having 1 to 20 C atoms. Typical examples of non-mesogenic compounds containing more than two polymerisable groups are trimethylolpropane trimethacrylate and pentaerythritol tetraacrylate. Typical examples of mesogenic or liquid-crystalline polymerisable compounds are described, for example, in WO 93/22397, EP 0 261 712, DE 195 04 224, WO 95/22586 and WO 97/00600.

In the formulae mentioned above and below, the term "fluorinated alkyl or alkoxy having 1 to 3 C atoms" preferably denotes $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, OCFHCF$_2$H, OCFHCFH$_2$, OCH$_2$CF$_3$, OCH$_2$CF$_2$H, OCH$_2$CFH$_2$, OCF$_2$CF$_2$H, OCF$_2$CFH$_2$, C$_3$F$_7$ or OC$_3$F$_7$, in particular CF$_3$, OCF$_3$, CF$_2$H, OCF$_2$H, C$_2$F$_5$, OC$_2$F$_5$, CFHCF$_3$, CFHCF$_2$H, CFHCFH$_2$, CF$_2$CF$_2$H, CF$_2$CFH$_2$, OCFHCF$_3$, OCFHCF$_2$H, OCFHCFH$_2$, OCF$_2$CF$_2$H, OCF$_2$CFH$_2$, C$_3$F$_7$ or OC$_3$F$_7$, particularly preferably OCF$_3$ or OCF$_2$H.

The term "alkyl" encompasses straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" encompasses straight-chain and branched alkenyl groups having 2-7 carbon atoms, in particular the straight-chain groups. Particularly preferred alkenyl groups are C$_2$-C$_7$-1E-alkenyl, C$_4$-C$_7$-3E-alkenyl, C$_5$-C$_7$-4-alkenyl, C$_6$-C$_7$-5-alkenyl and C$_7$-6-alkenyl, in particular C$_2$-C$_7$-1E-alkenyl, C$_4$-C$_7$-3E-alkenyl and C$_5$-C$_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably encompasses straight-chain radicals of the formula C$_n$H$_{2n+1}$—O—(CH$_2$)$_m$, in which n and m each, independently of one another, denote 1 to 6. Preferably, n=1 and m is 1 to 6.

Halogen preferably denotes F or Cl, in particular F.

If one of the above-mentioned radicals is an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If one of the above-mentioned radicals is an alkyl radical in which one CH$_2$ group has been replaced by —CH═CH—, this may be straight-chain or branched. It is preferably straight-chain and has 2 to 10 C atoms. Accordingly, it denotes in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If one of the above-mentioned radicals is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms.

Accordingly, they denote in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If one of the above-mentioned radicals is an alkyl radical in which one CH$_2$ group has been replaced by unsubstituted or substituted —CH═CH— and an adjacent CH$_2$ group has been replaced by CO or CO—O or O—CO, this may be straight-chain or branched. It is preferably straight-chain and has 4 to 13 C atoms. Accordingly, it denotes in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above-mentioned radicals is an alkyl or alkenyl radical which is monosubstituted by CN or CF$_3$, this radical is preferably straight-chain. The substitution by CN or CF$_3$ is in any desired position.

If one of the above-mentioned radicals is an alkyl or alkenyl radical which is at least monosubstituted by halogen, this radical is preferably straight-chain, and halogen preferably denotes F or Cl. In the case of polysubstitution, halogen preferably denotes F. The resultant radicals also include perfluorinated radicals. In the case of monosubstitution, the fluorine or chlorine substituent may be in any desired position, but is preferably in the ω-position.

Compounds containing branched wing groups may occasionally be of importance owing to better solubility in the conventional liquid-crystalline base materials. However, they may in particular be suitable as chiral dopants if they are optically active.

Branched groups of this type generally contain not more than one chain branch. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If one of the above-mentioned radicals is an alkyl radical in which two or more CH$_2$ groups have been replaced by —O— and/or —CO—O—, this may be straight-chain or branched. It is preferably branched and has 3 to 12 C atoms. Accordingly, it denotes in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The invention furthermore relates to the use of the CLC media according to the invention for electro-optical purposes.

The invention furthermore also relates to an electro-optical display containing CLC media according to the invention, in particular an SSCT, PSCT or flexoelectric display having two plane-parallel outer plates which, together with a frame, form a cell, and a cholesteric liquid-crystal mixture located in the cell.

The invention furthermore relates to an electro-optical active-matrix display containing CLC media according to the invention, in particular an AM-CLC display, preferably an AM-SSCT or PSCT display, having two plane-parallel outer plates which, together with a frame, form a cell, integrated nonlinear elements for the switching of individual pixels on the outer plates, and a cholesteric liquid-crystal mixture located in the cell, which preferably has positive dielectric anisotropy and high specific resistance.

The construction of bistable SSCT and PSCT cells is described, for example, in WO 92/19695, WO 93/23496, U.S. Pat. No. 5,453,863 and U.S. Pat. No. 5,493,430. The construction of active-matrix CLC displays is described, for example, in WO 02/086855 and US 2002-0149552.

The invention furthermore relates to a laser containing CLC media according to the invention, in particular as helically birefringent mirror in pure form and/or in the active laser material as host material for one or more dyes, such as, for example, fluorescent or phosphorescent dyes.

The construction of laser arrangements is known to the person skilled in the art and is described in the literature, for example in E. Yablanovitch, Phys. Rev. Lett. 58(20), 2059 (1987), J. Dowling, M. Scalora, M. Bloemer, M. Bowden, J. Appl. Phys. 75(4), 1896 (1994), V. Kopp, B. Fan, H. Vithana, A. Genack, Optics Letters 23(21), 1707 (1998) and P. Palffy-Muhoray, A. Munoz, B. Taheri, R. Twieg, SID Digest, 1170 (2000).

Suitable laser dyes are known to the person skilled in the art and are described in the literature, for example in the catalogue "Lambdachrome® Laser Dyes", 3rd Edition (2000) from Lambda Physik AG, D-37079 Goettingen, Germany. Particular preference is given to dyes having an excitation wavelength of about 355 nm, such as, for example, the dye CLD-2 (Philips AG, Eindhoven, Netherlands) having a wavelength of 360 nm.

Particular preference is given to CLC media having an absorption of <1% at a wavelength of >400 nm, preferably >350 nm, particularly preferably in the range 350 to 400 nm. Very particular preference is given to media which exhibit no significant absorption at a wavelength of 350 to 420 nm, preferably 350 to 400 nm.

The liquid-crystal mixtures according to the invention facilitate a significant broadening of the available parameter latitude. Thus, the achievable combinations of reflection wavelength, birefringence, clearing point, viscosity, thermal and UV stability and dielectric anisotropy far exceed previous materials from the prior art and make the media according to the invention particularly suitable for use in CLC displays and mirror-free lasers.

The liquid-crystal mixtures according to the invention preferably have a cholesteric phase down to −20° C. and preferably down to −30° C., particularly preferably down to −40° C., and clearing points of at least 70° C., preferably at least 80° C., particularly preferably at least 100° C. The dielectric anisotropy $\Delta\epsilon$ is preferably $\geq 5$, in particular $\geq 10$, very particularly preferably $\geq 15$.

The birefringence $\Delta n$ is preferably $\geq 0.08$, in particular $\geq 0.09$ and preferably $\leq 0.3$, in particular $\leq 0.16$, particularly preferably $\leq 0.15$, very particularly preferably $\leq 0.14$ and preferably between 0.09 and 0.14.

For applications in CLC displays having high birefringence, $\Delta n$ is preferably >0.16, in particular >0.18, particularly preferably >0.20.

At the same time, the liquid-crystal mixtures according to the invention have low values for the viscosity and high values for the specific resistance, enabling excellent CLC displays, in particular AM-CLC displays, to be achieved. In particular, the mixtures are characterised by low operating voltages.

It goes without saying that a suitable choice of the components of the mixtures according to the invention also enables higher clearing points (for example above 120° C.) to be achieved at higher threshold voltages or lower clearing points to be achieved at lower threshold voltages while retaining the other advantageous properties. Mixtures of greater $\Delta\epsilon$ and thus lower thresholds can likewise be achieved with viscosities correspondingly increased only slightly.

The width of the cholesteric phase range is preferably at least 90° C., in particular at least 100° C. This range preferably extends at least from −20° to +60° C., particularly preferably at least from −20° to +70° C., very particularly preferably at least from −20° to +80° C.

The UV stability of the mixtures according to the invention is also considerably better, i.e. they exhibit a significantly smaller change in the reflection wavelength and operating voltage on UV exposure.

The individual compounds of the formulae above and below and their sub-formulae which can be used in the media according to the invention are either known or can be prepared analogously to the known compounds.

In particularly preferred embodiments, the nematic component of the media according to the invention comprises one or more compounds of the formula I2a in which $X^0$ denotes $OCF_3$, one or more compounds of the formula I1b in which $X^0$ denotes F, one or more compounds of the formula I2a in which $X^0$ denotes F, one or more compounds of the formula I2k in which $X^0$ denotes F, one or more compounds of the formula I3a and/or I3b in which $X^0$ denotes F, one or more compounds of the formula I3c in which $X^0$ denotes F, at least one compound of the formula I1 or I2, at least one compound of the formula I3, at least one compound of the formula I1 and at least one compound of the formula I3, at least one compound of the formula I1b and at least one compound of the formula I3b or I3c in each of which $X^0$ denotes F, 1 to 20, in particular 5 to 15, compounds of the formula I, more than 20%, in particular more than 40%, preferably more than 50%, of one or more compounds of the formula I, at least 60%, preferably at least 80%, of one or more compounds of the formula I, 5 to 50%, preferably 15 to 45%, of compounds of the formula I1, 5 to 45%, preferably 10 to 35%, of compounds of the formula I2, 10 to 65%, preferably 20 to 55%, of compounds of the formula I3, one or more compounds of the formula II, in particular those of the formula IIa, in which $X^0$ preferably denotes F, 3 to 40%, in particular 4 to 30%, particularly preferably 5 to 20%, of one or more compounds of the formula II.

In a further particularly preferred embodiment, the nematic component essentially consists of compounds selected from the formulae I1, I2, I3 and II.

In further particularly preferred embodiments, the optically active component of the media according to the invention comprises one or more dopants selected from the formulae XV, XVI, XVII, XVIII and XIX, one or more dopants selected from the formula XX, not more than one dopant, preferably selected from the formula XX, preferably in a proportion of less than 8%, in particular less than 5%, of the mixture as a whole.

In a further particularly preferred embodiment, the media according to the invention comprise 20% or less, in particular 0.01 to 10%, of the optically active component.

Through a suitable choice of the terminal radicals $R^{0-2}$ and $X^0$ in the compounds of the formulae I to XIV, the addressing times, the threshold voltage and further properties can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $K_3$ (bend) and $K_1$ (splay) compared with alkyl or alkoxy radicals. 4-Alkenyl radicals, 3-alkenyl radicals and the like generally give lower threshold voltages and smaller values of $K_3/K_1$ compared with alkyl and alkoxy radicals.

In the bridging units $Z^{0-4}$, a —$CH_2CH_2$— group generally results in higher values of $K_3/K_1$ compared with a single covalent bond. Higher values of $K_3/K_1$ facilitate, for example, a shorter reflection wavelength without changing the dopant concentration owing to the higher HTP.

The optimum mixing ratio of the individual compounds of the formulae I to XX depends substantially on the desired properties, on the choice of the compounds of the formulae I to XX and on the choice of further optionally present components. Suitable mixing ratios within the above-mentioned range can easily be determined from case to case.

Besides the compounds of the formulae I to XX, the CLC media may comprise one or more further components for the purpose of optimisation of various properties.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after mixing.

The liquid-crystal mixtures according to the invention may also comprise further additives, such as, for example, one or more stabilisers or antioxidants.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively. The coding in Table B is self-evident. In Table A, only the acronym for the parent structure is given. In individual cases, the acronym for the parent structure is followed, separated by a dash, by a code for the substituents $R^1$, $R^2$, $L^1$ $L^2$ and $L^3$:

| Code for $R^1$, $R^1 R^2$, $L^1$, $L^2$, $L^3$ | | $R^2$ | $L^1 L^2 L^3$ |
|---|---|---|---|
| nm | $C_nH_{2n+1}$ | $C_mH_{2m+1}$ | H H H |
| nOm | $C_nH_{2n+1}$ | $C_mH_{2m+1}$ | H H H |
| nO.m | $C_nH_{2n+1}$ | $OC_mH_{2m+1}$ | H H H |
| n | $C_nH_{2n+1}$ | CN | H H H |
| nN.F | $C_nH_{2n+1}$ | CN | H H F |
| nN.F.F | $C_nH_{2n+1}$ | CN | H F F |
| nF | $C_nH_{2n+1}$ | F | H H H |
| nOF | $OC_nH_{2n+1}$ | F | H H H |
| nF.F | $C_nH_{2n+1}$ | F | H H F |
| nmF | $C_nH_{2n+1}$ | $C_mH_{2m+1}$ | F H H |
| nOCF$_3$/nOT | $C_nH_{2n+1}$ | OCF$_3$ | H H H |
| n-Vm | $C_nH_{2n+1}$ | —CH=CH—$C_mH_{2m+1}$ | H H H |
| nV-Vm | $C_nH_{2n+1}$—CH=CH— | —CH=CH—$C_mH_{2m+1}$ | H H H |

Preferred mixture components are shown in Tables A, B and C.

TABLE A ($L^1$, $L^2$ and $L^3$ = H or F)

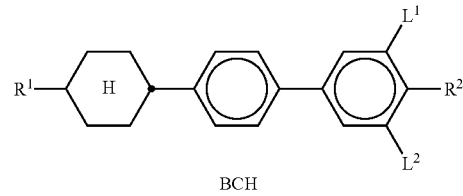

BCH

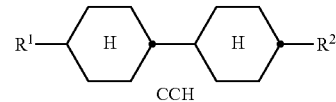

CCH

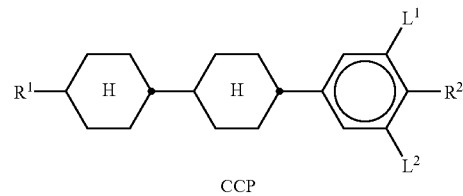

CCP

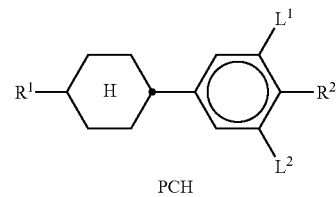

PCH

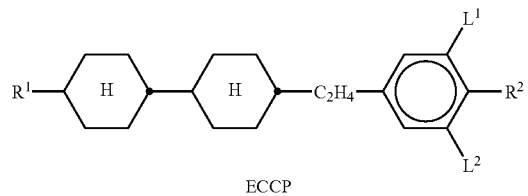

ECCP

TABLE A-continued
($L^1$, $L^2$ and $L^3$ = H or F)
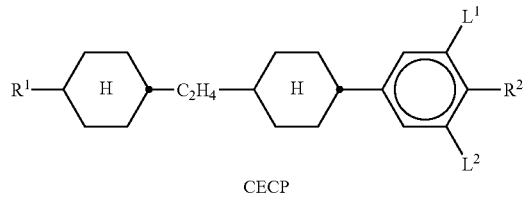
CECP
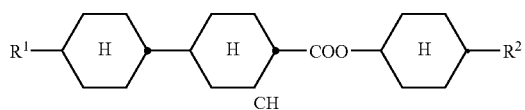
CH
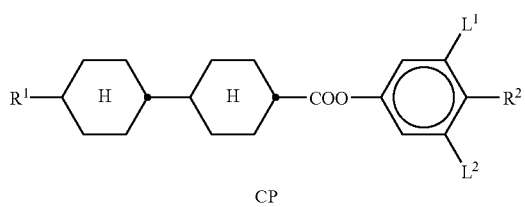
CP
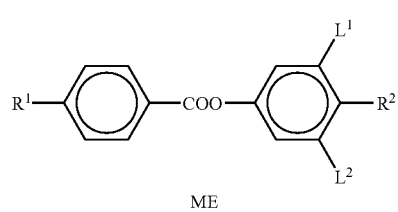
ME
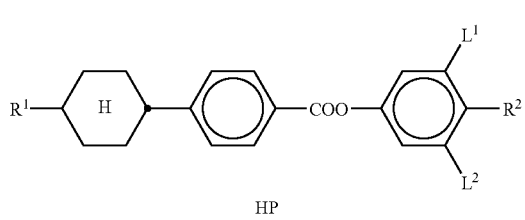
HP
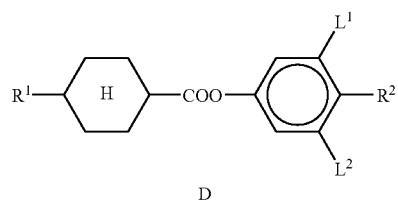
D
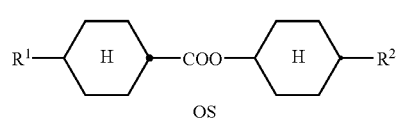
OS
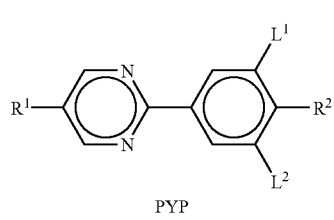
PYP
TABLE A-continued
($L^1$, $L^2$ and $L^3$ = H or F)
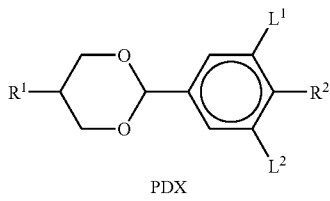
PDX
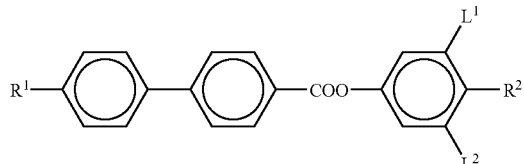
CE
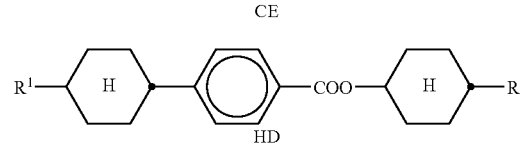
HD
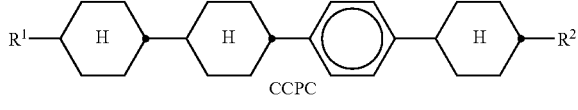
CCPC
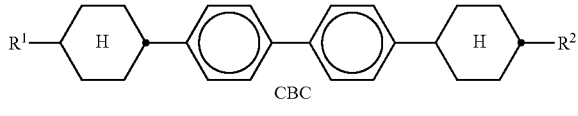
CBC
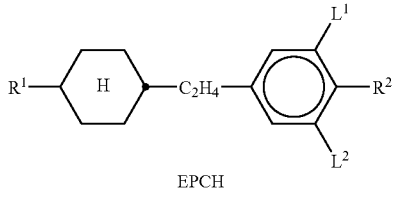
EPCH
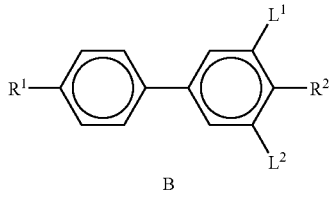
B
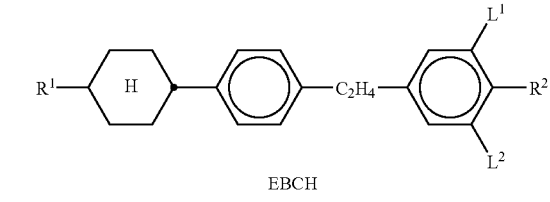
EBCH
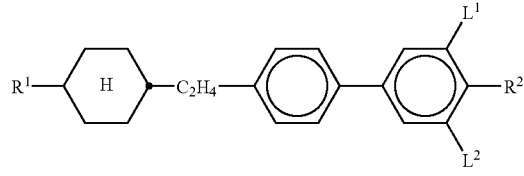

TABLE A-continued ($L^1$, $L^2$ and $L^3$ = H or F)

BECH

CPC

FET-nF

TABLE B

Inm

CVCP-nV-(O)m

CC-nV-Vm

CC-n-V

CCP-Vn-m

CCP-V-m

CCG-V-F

CPP-nV-m

TABLE B-continued

CBC-nmF

CUZG-n-F

CCZU-n-F

CGG-n-F

CGU-n-F

CDU-n-F

PGU-n-F

CCZG-n-OT

TABLE B-continued
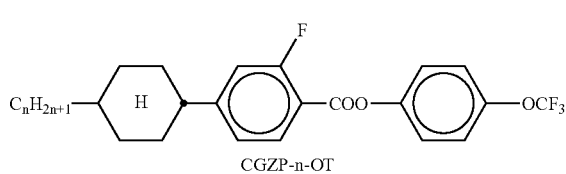
CGZP-n-OT
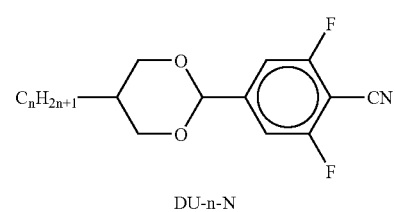
DU-n-N
TABLE B-continued
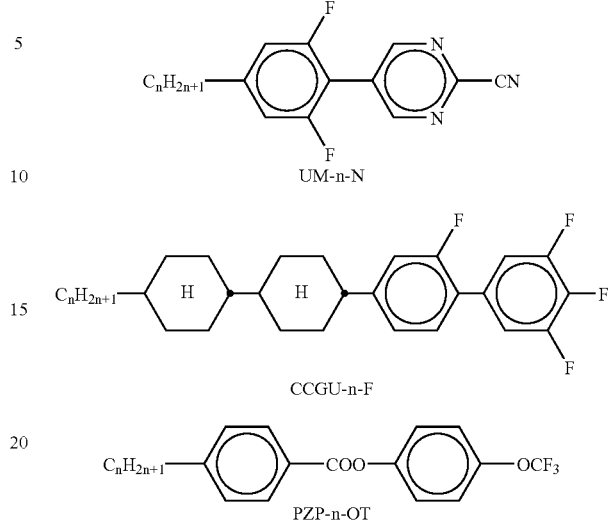
UM-n-N
CCGU-n-F
PZP-n-OT
TABLE C
(dopants):
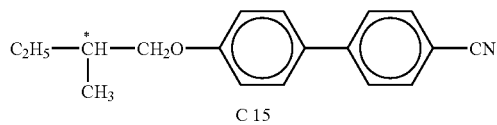
C 15
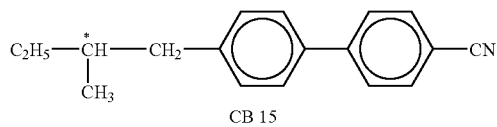
CB 15
CM 21
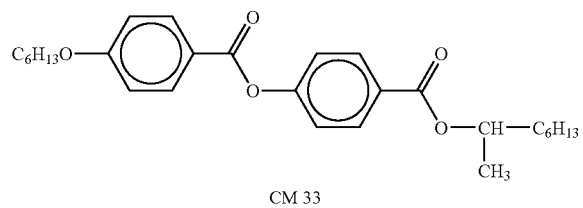
CM 33
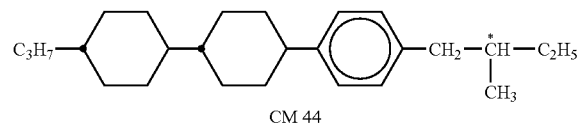
CM 44
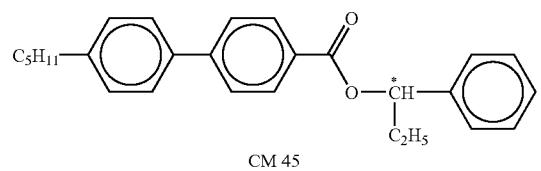
CM 45

TABLE C-continued
(dopants):
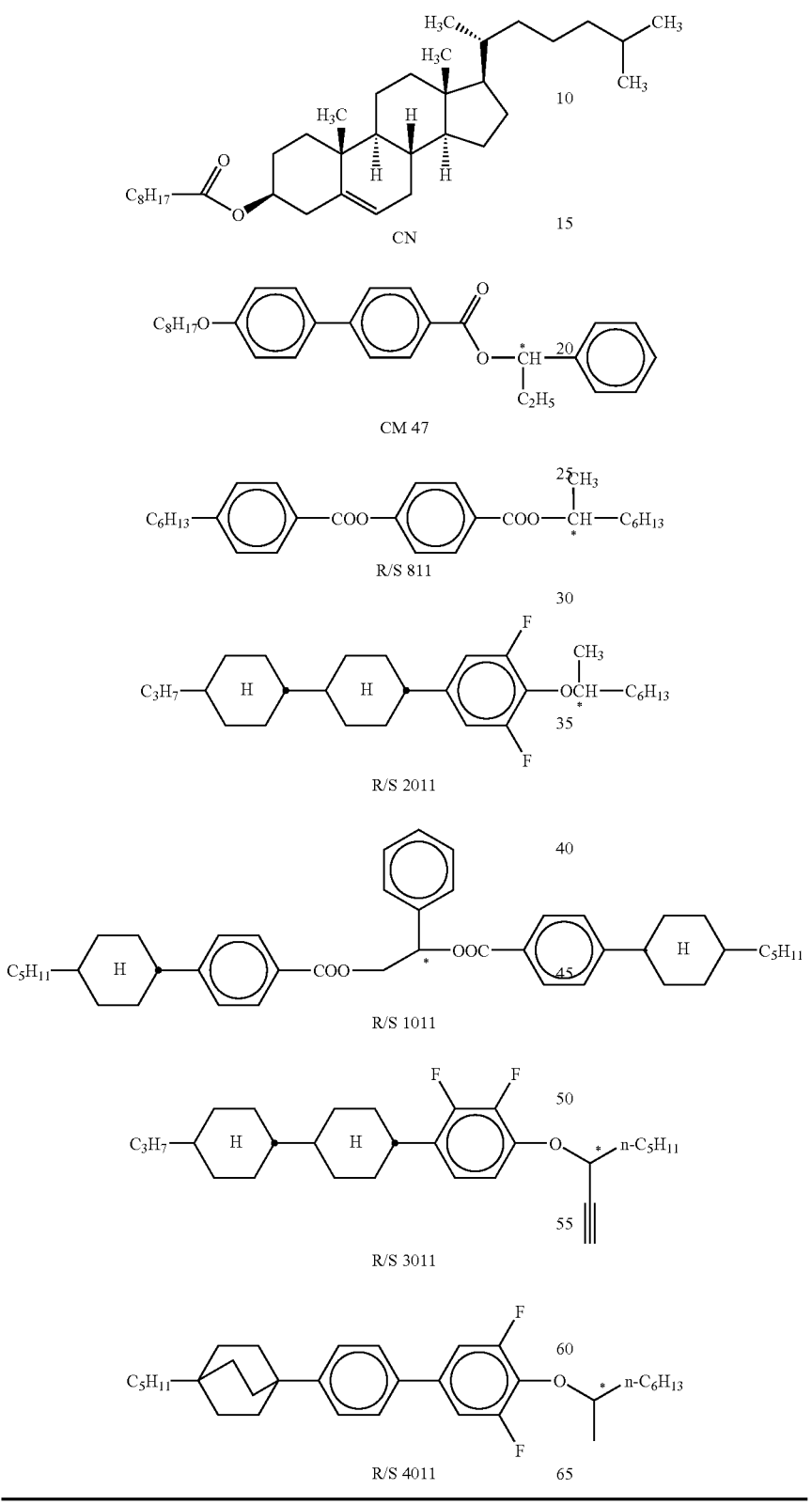

TABLE D
Suitable stabilisers and antioxidants for LC mixtures are indicated below
(n = 0-10, terminal methyl groups are not shown):
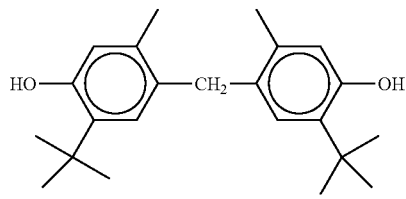
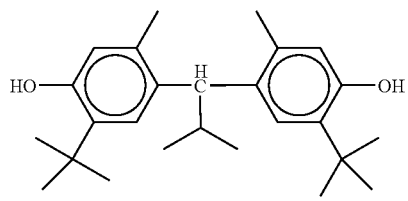
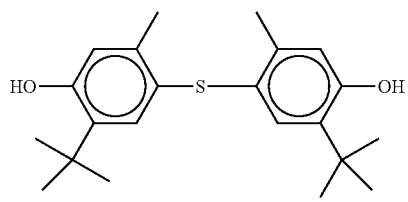
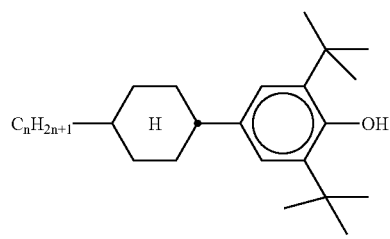
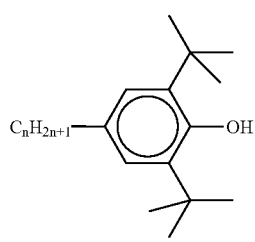
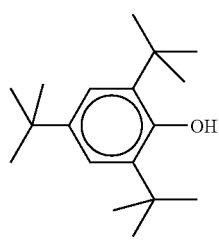
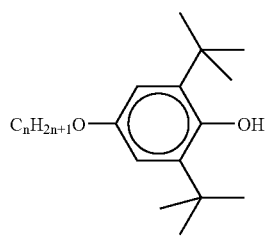

TABLE D-continued
Suitable stabilisers and antioxidants for LC mixtures are indicated below
(n = 0-10, terminal methyl groups are not shown):
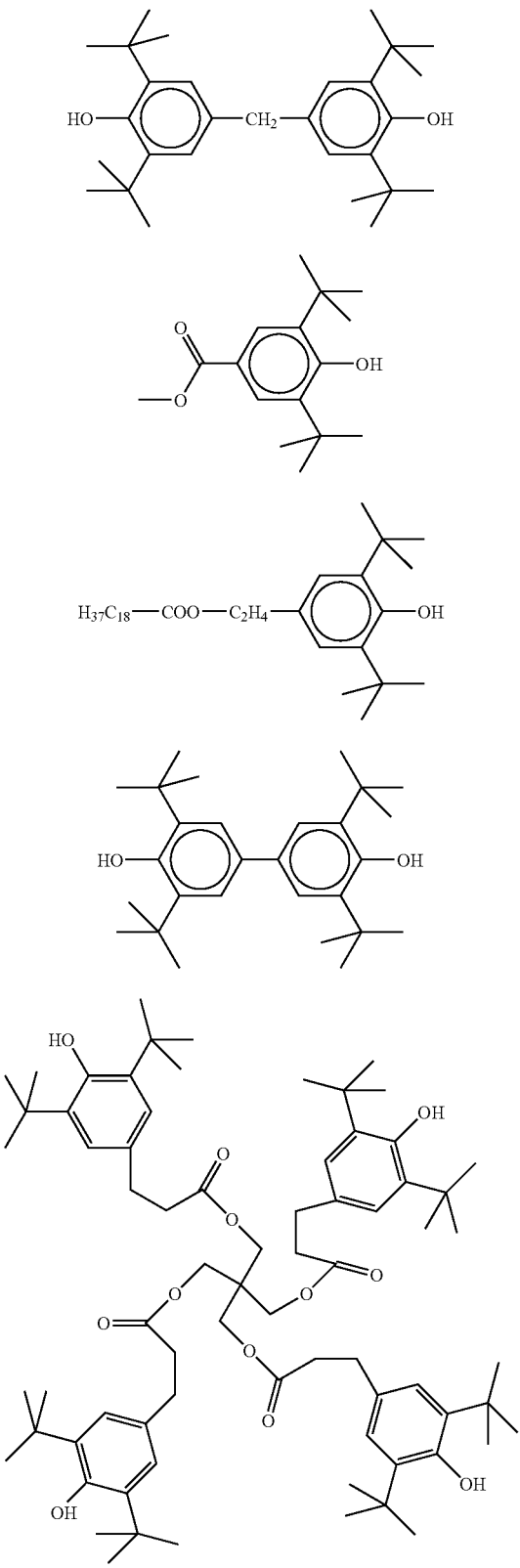

TABLE D-continued
Suitable stabilisers and antioxidants for LC mixtures are indicated below
(n = 0-10, terminal methyl groups are not shown):
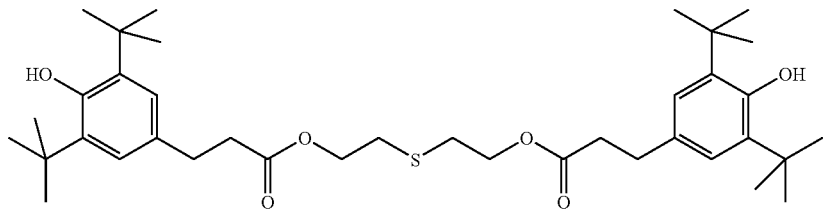
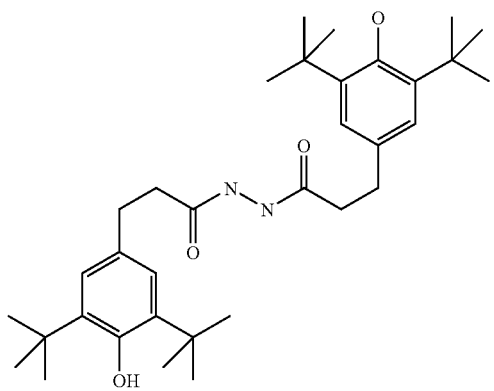
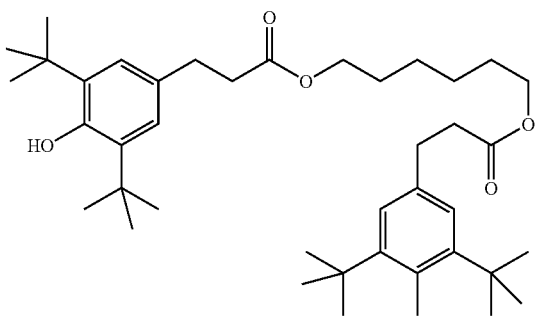
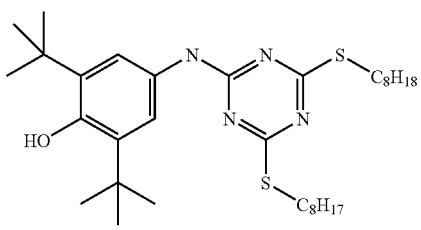

TABLE D-continued
Suitable stabilisers and antioxidants for LC mixtures are indicated below (n = 0-10, terminal methyl groups are not shown):
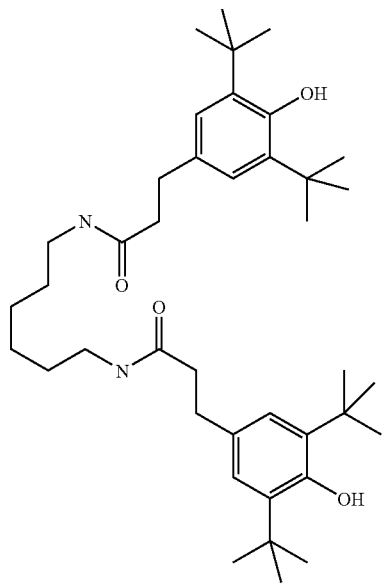
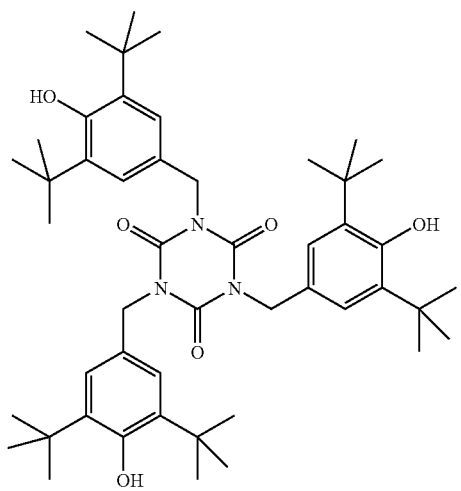
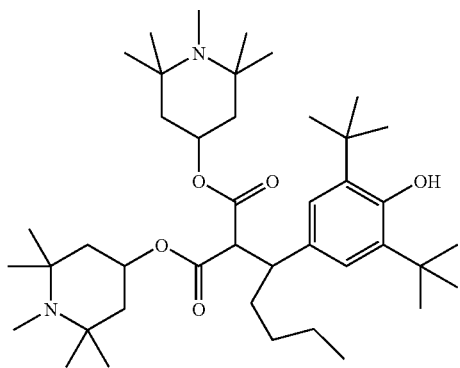

TABLE D-continued
Suitable stabilisers and antioxidants for LC mixtures are indicated below
(n = 0-10, terminal methyl groups are not shown):
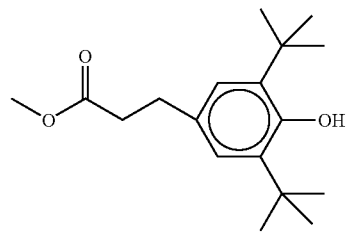
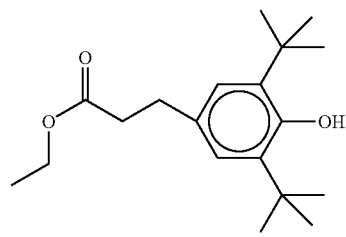
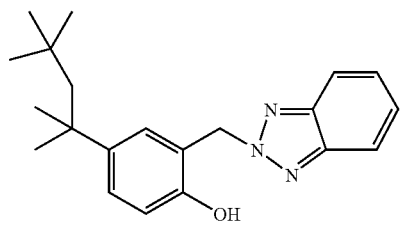
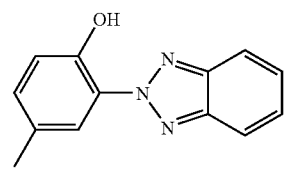
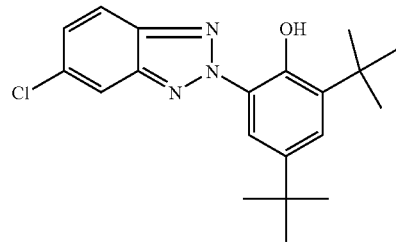
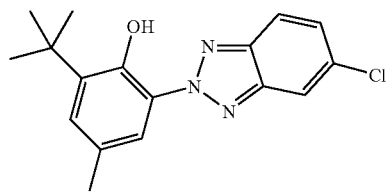

TABLE D-continued
Suitable stabilisers and antioxidants for LC mixtures are indicated below
(n = 0-10, terminal methyl groups are not shown):
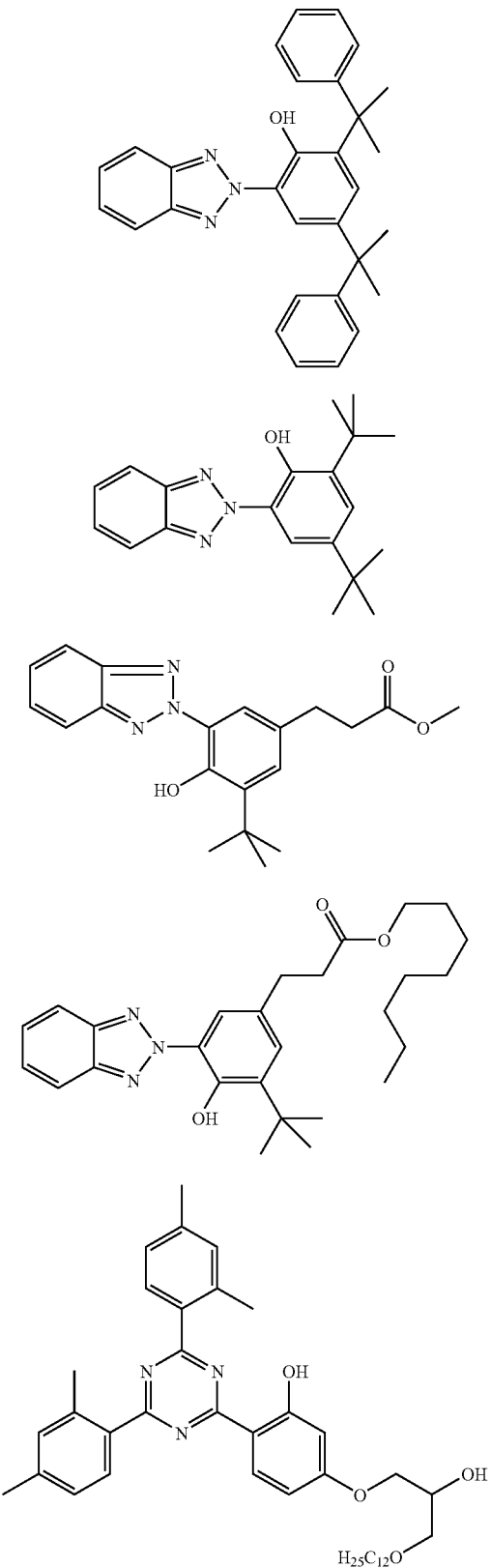

TABLE D-continued
Suitable stabilisers and antioxidants for LC mixtures are indicated below
(n = 0-10, terminal methyl groups are not shown):
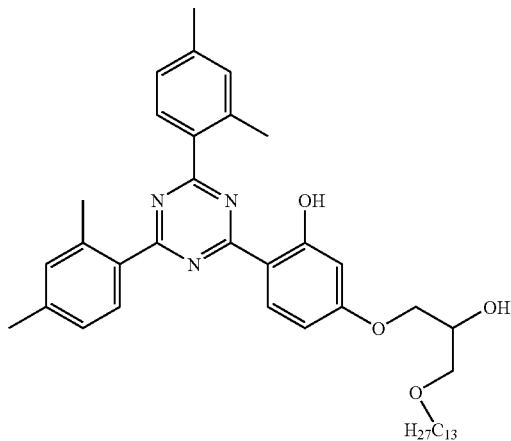
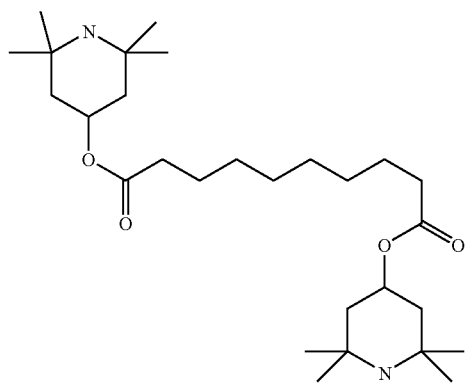
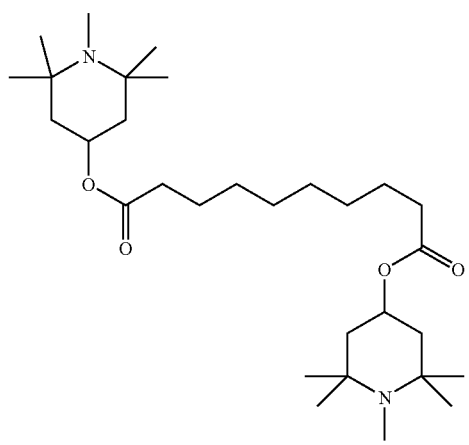

The following examples are intended to explain the invention without limiting it.

Above and below, percentages are percent by weight. All temperatures are given in degrees Celsius. m.p. denotes melting point, cl.p.=clearing point. Furthermore, C=crystalline state, S=smectic phase, N=nematic phase, Ch=cholesteric phase and I=isotropic phase. The data between these symbols represent the transition temperatures.

Furthermore, the following abbreviations are used

Δn optical anisotropy at 589 nm and 20° C.

| | |
|---|---|
| Δn | optical anisotropy at 589 nm and 20° C. |
| $n_e$ | extraordinary refractive index at 589 nm and 20° C. |
| Δε | dielectric anisotropy at 20° C. |
| ε∥ | dielectric constant parallel to the longitudinal molecular axes |
| γ1 | rotational viscosity [mPa · sec], at 20° C. unless indicated |
| λ | reflection wavelength [nm], at 20° C. unless indicated otherwise otherwise |
| dλ | maximum variation of the reflection wavelength [nm] in the stated temperature range, between −20 and +70° C. unless indicated otherwise |
| VHR | the voltage holding ratio (VHR) on heating at 100° C. or during UV exposure (wavelength >300 nm; irradiation intensity 765 W/m$^2$) for 2 h |

The helical twisting power (HTP) of a chiral compound which induces a helically twisted superstructure in a liquid-crystalline mixture is given by the equation HTP=(p·c)$^{-1}$ [μm$^{-1}$]. In this equation, p denotes the helical pitch of the helically twisted phase in μm, and c denotes the concentration of the chiral compound (a value of 0.01 for c corresponds, for example, to a concentration of 1% by weight). Unless indicated otherwise, HTP values above and below relate to a temperature of 20° C. and the commercially available neutral nematic TN host mixture MLC-6260 (Merck KGaA, Darmstadt).

The physical parameters were determined experimentally in accordance with "Licristal, Physical Properties Of Liquid Crystals, Description of the measurement methods", Ed. W. Becker, Merck KGaA, Darmstadt, revised edition, 1998.

EXAMPLE 1

A cholesteric mixture C1 comprises 97.9% of a nematic component N1 consisting of

| | | | |
|---|---|---|---|
| CCP-2OCF3 | 3.0% | cl.p. | 80.5 |
| CCP-3OCF3 | 3.0% | Δn | 0.1032 |
| CCP-2F.F.F | 10.0% | $n_e$ | 1.5906 |
| CCP-3F.F.F | 10.0% | Δε | +12.4 |
| CCP-5F.F.F | 4.0% | γ₁ | 176 |
| BCH-2F.F | 7.0% | | |
| BCH-3F.F | 7.0% | | |
| BCH-3F.F.F | 13.0% | | |
| CGU-2-F | 7.0% | | |
| CGU-3-F | 7.0% | | |
| CCZU-2-F | 3.0% | | |
| CCZU-3-F | 15.0% | | |
| CCZU-5-F | 3.0% | | |
| CCGU-3-F | 8.0% | | | and 2.1% of a chiral compound of the following formula:

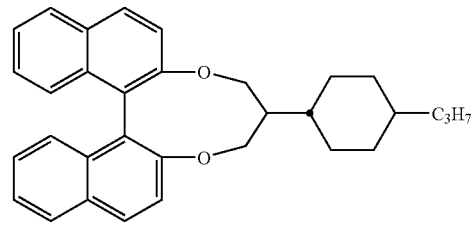

XXb1 and has a reflection wavelength λ of 550 nm and dλ of 75 nm.

EXAMPLE 2

A cholesteric mixture C2 comprises 97.68% of a nematic component N2 consisting of

| | | | |
|---|---|---|---|
| CCP-3OCF3 | 6.0% | cl.p. | 70.5 |
| CCP-2F.F.F | 10.0% | Δn | 0.0903 |
| CCP-3F.F.F | 10.0% | $n_e$ | 1.5906 |
| BCH-3F.F.F | 5.0% | Δε | +12.8 |
| CGU-2-F | 11.0% | VHR | 99.7% |
| CGU-3-F | 11.0% | VHR after heating | 96.6% |
| CGU-5-F | 10.0% | VHR after UV | 97.8% |
| CCZU-2-F | 7.0% | | |
| CCZU-3-F | 15.0% | | |
| CCZU-5-F | 7.0% | | |
| ECCP-5F.F | 8.0% | | | and 2.32% of a chiral compound of the formula XXb1 and has a reflection wavelength λ of 426 nm and dλ of 45 nm.

Comparative Example 1

A cholesteric mixture CC1 comprises 95% of a nematic component NC1 consisting of

| | | | |
|---|---|---|---|
| K6 | 8.0% | cl.p. | 98.5 |
| K9 | 9.0% | Δn | 0.1774 |
| BCH-5 | 10.0% | | |
| HP-3N.F | 7.0% | Δε | +32.9 |
| HP-4N.F | 5.0% | VHR | 93.9% |
| HP-5N.F | 5.0% | | |
| ME2N.F | 8.0% | | |
| ME3N.F | 10.0% | | |
| ME4N.F | 10.0% | | |
| ME5N.F | 4.0% | | |
| CC-5-V | 13.0% | | |
| CBC-33 | 2.0% | | |
| CBC-53 | 3.0% | | | and 2.5% of each of the chiral compounds of the formulae XVIII1 and XVIII2

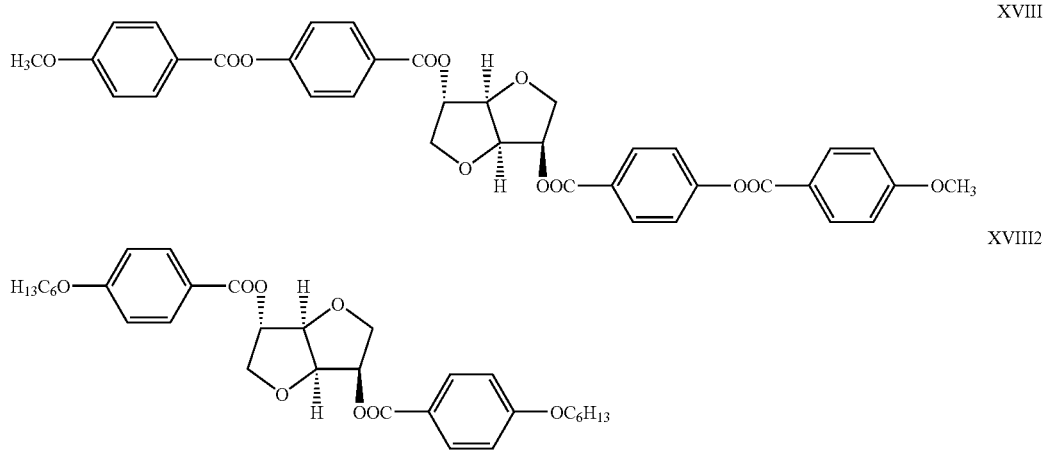

XVIII

XVIII2 and has a reflection wavelength λ of 465 nm and dλ of 82 nm.

The mixture CC1 has a significantly lower VHR compared with mixture C2 from Example 2.

Figure 1:
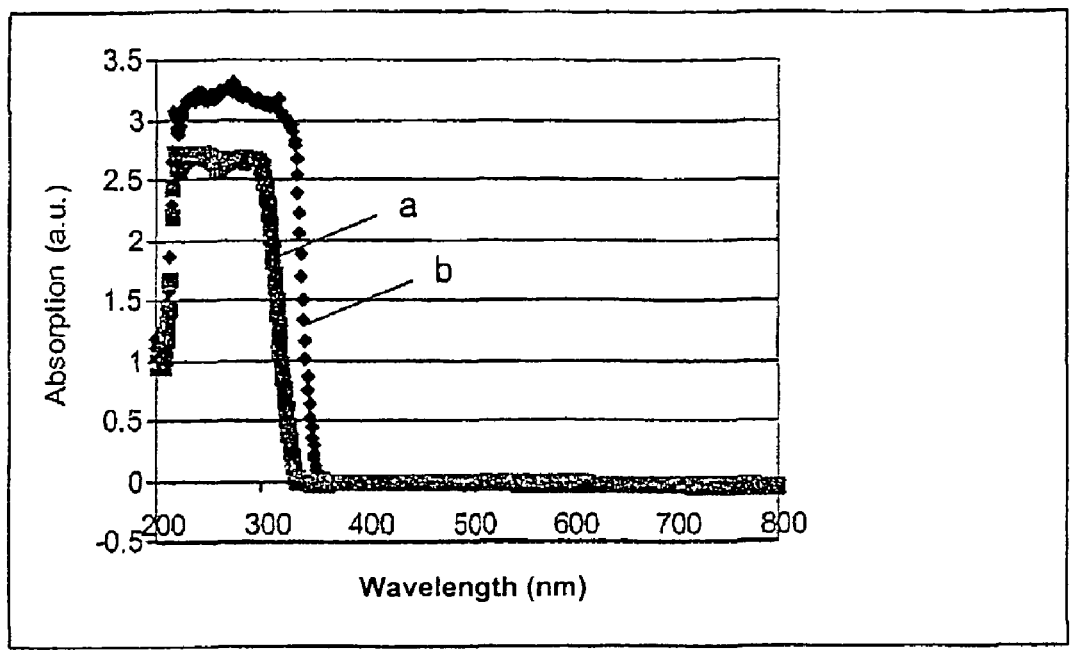
FIG. 1 shows the absorption curves of nematic mixture N2 from Example 2 (a) and nematic mixture NC1 from the comparative example (b). Both mixtures exhibit absorption in the UV region.
Figure 2:
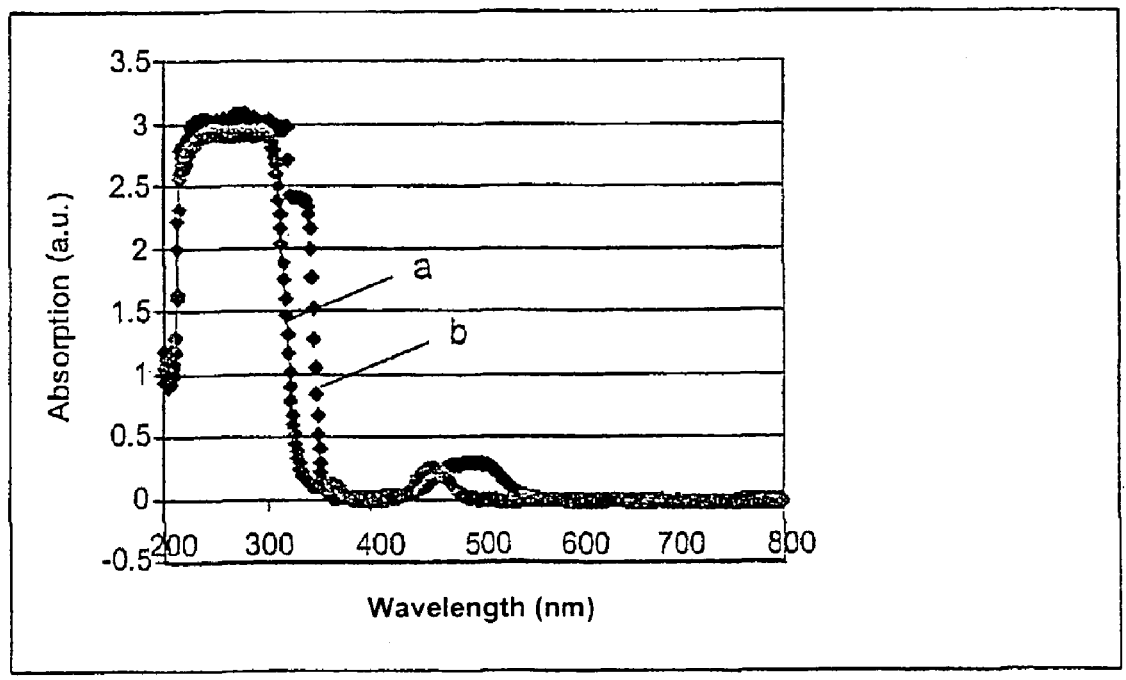
FIG. 2 shows the absorption curves of cholesteric mixture C2 from Example 2 (a) and cholesteric mixture CC1 from the comparative example (b). In addition to absorption in the UV region, both mixtures exhibit low absorption in the region of the cholesteric reflection band.

As can be clearly seen from FIGS. 1 and 2, mixtures N2 and C2 according to the invention exhibit lower UV absorption than comparative mixtures NC1 and CC1 respectively. In particular, however, the absorption band of mixtures N2 and C2 according to the invention is shifted 20 nm to shorter wavelengths compared with the comparative mixtures and is thus below the typical laser excitation wavelength of 355 nm. The mixtures according to the invention are therefore particularly suitable for use as host material in an active laser medium.

The invention claimed is:

1. A liquid-crystalline medium having a helically twisted structure comprising a nematic component and an optically active component, wherein the optically active component comprises one or more chiral compounds whose helical twisting power and concentration are selected in such a way that the helical pitch of the medium is ≦1 μm, and the nematic component comprises at least 75% by weight of one or more compounds containing a 3,4,5-trifluorophenyl group selected from the following formulae

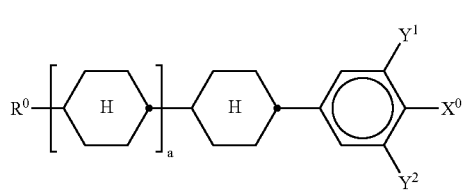

I1

-continued

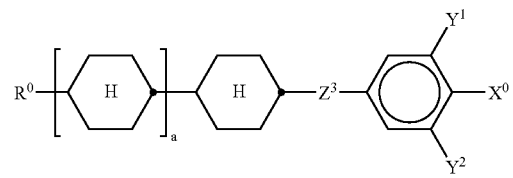

I2

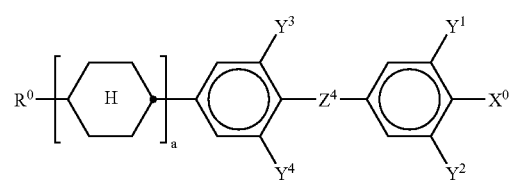

I3 in which $Z^3$ in each case, independently of one another, denotes COO, $C_2H_4$, $CF_2O$ or $C_2F_4$, and $Z^4$ in each case, independently of one another, denotes COO, $CF_2O$, $C_2F_4$ or a single bond, $R^0$ denotes H or an alkyl or alkenyl radical having 1 to 20 C atoms which is unsubstituted, monosubstituted by CN or $CF_3$ or at least monosubstituted by halogen, where, in addition, one or more $CH_2$ groups in these radicals may each, independently of one another, be replaced by —O—, —S—, —CO—, —CO—O—, —O—CO—, —O—CO—O—, —CH=CH— or —C≡C— in such a way that O atoms are not linked directly to one another, $Y^3$ to $Y^4$ each, independently of one another, denote H or F, $Y^1$, $Y^2$ denote F, $X^0$ denotes F, and a denotes 0 or 1.

2. A liquid-crystalline medium of claim 1 wherein the nematic component comprises one or more compounds of the formula I

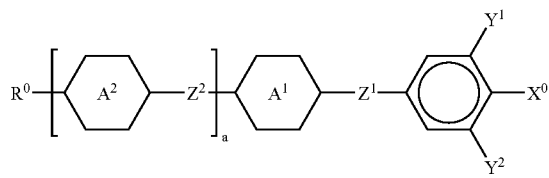

in which
R⁰ denotes H or an alkyl or alkenyl radical having 1 to 20 C atoms which is unsubstituted, monosubstituted by CN or CF₃ or at least monosubstituted by halogen, where, in addition, one or more CH2 groups in these radicals may each, independently of one another, be replaced by —O—, —S—, —CO—, —CO—O—, —O—CO—, —O—CO—O—, —CH=CH— or —C≡C— in such a way that O atoms are not linked directly to one another,

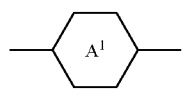 and 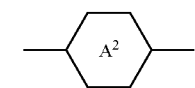

each, independently of one another, denote

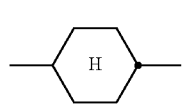 or 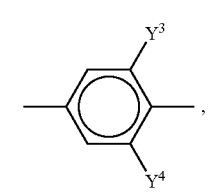,

Y¹ to Y⁴ each, independently of one another, denote H or F,
Z¹ and Z² each, independently of one another, denote —O—, —S—, —CO—, —COO—, —OCO—, —S—CO—, —CO—S—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CH—, —CF=CH—, —CH=CF—, —CF=CF—, —C≡C— or a single bond,
X⁰ denotes F, Cl, halogenated alkyl, alkenyl or alkoxy having 1 to 6 C atoms,
a denotes 0 or 1, and wherein the compounds of the formula I are different from the compounds of the formulae I1, I2 and I3.

3. A medium according to claim 2, comprising one or more compounds selected from the following formula

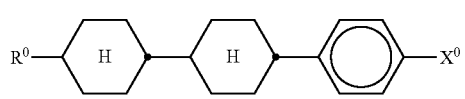

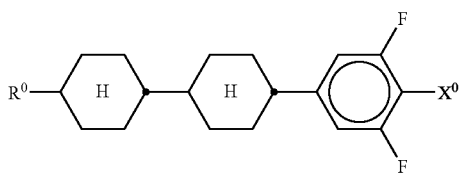

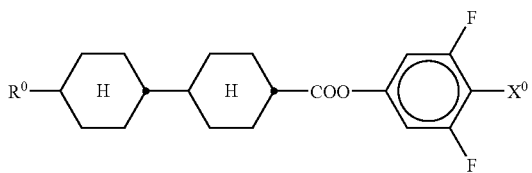

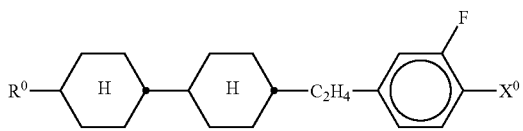

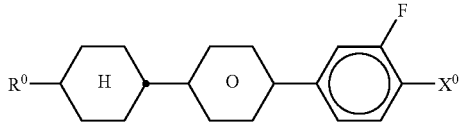

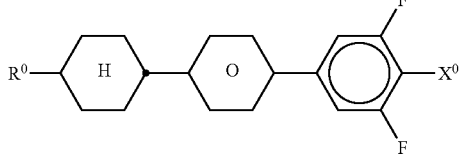

in which R⁰ and X⁰ have the meaning indicated in claim 2.

4. A medium according to claim 2, further comprising one or more compounds of the following formula

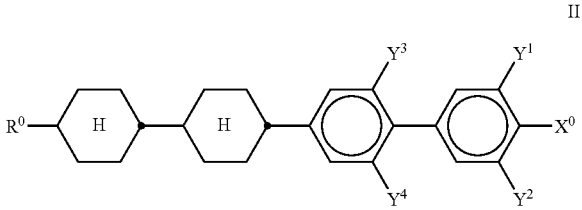

in which R⁰, X⁰, Y¹, Y², Y³ and Y⁴ have the meaning indicated in claim 2.

5. A medium according to claim 1, wherein the nematic component comprises 5 to 50% of compounds of the formula I1,
5 to 45% of compounds of the formula I2,
10 to 65% of compounds of the formula I3, and
3 to 40% of compounds of the formula II

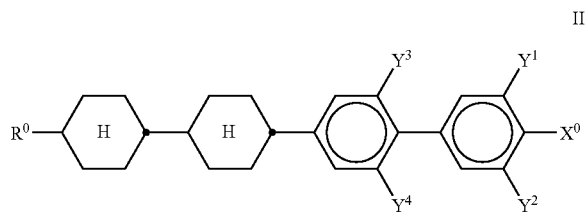

in which
- $R^0$ denotes H or an alkyl or alkenyl radical having 1 to 20 C atoms which is unsubstituted, monosubstituted by CN or $CF_3$ or at least monosubstituted by halogen, where, in addition, one or more $CH_2$ groups in these radicals may each, independently of one another, be replaced by —O—, —S—, —CO—, —CO—O—, —O—CO—, —O—CO—O—, —CH=CH— or —C≡C— in such a way that O atoms are not linked directly to one another,
- $Y^1$ to $Y^4$ each, independently of one another, denote H or F, and
- $X^0$ denotes F, Cl, halogenated alkyl, alkenyl or alkoxy having 1 to 6 C atoms.

6. A medium according to claim 1, wherein the medium has a reflection wavelength in the range from 400 to 800 nm.

7. A medium according to claim 1, further comprising one or more dyes.

8. An electro-optical, laser-optical or nonlinear-optical device comprising a medium according to claim 1.

9. An electro-optical liquid-crystal display containing a medium according to claim 1.

10. An electro-optical liquid-crystal display according to claim 9, that is a cholesteric, SSCT, PSCT or flexoelectric display.

11. An electro-optical liquid-crystal display according to claim 9, that is an active-matrix display.

12. An active laser material or resonator for laser applications, containing a medium according to claim 1, wherein said medium is a cholesteric liquid crystal medium.

13. A laser arrangement or an active laser material or a resonator therefore containing a medium according to claim 1.

14. A medium according to claim 4, wherein $X^0$ in the formula Ia denotes $OCF_3$ and $X^0$ in the formulae I1b, I2a, I2k, I3a, I3b and I3c denotes F.

15. A medium according to claim 2, comprising at least one compound of formula I in which $X^0$, $Y^1$ and $Y^2$ denote F, and at least one compound of the formula I in which $X^0$ denotes Cl, $CF_3$, $OCF_3$ or $OCHF_2$.

16. A medium according to claim 2, wherein $Z^1$ and $Z^2$ denote —COO—, —OCO—, —OCH$_2$—, —CH$_2$O—, —CF$_2$O—, —OCF$_2$—, —CH$_2$CH$_2$—, —CF$_2$CH$_2$—, —CH$_2$CF$_2$—, —CF$_2$CF$_2$— or a single bond.

17. A medium according to claim 2, wherein the nematic component comprises one or more compounds of formula I, wherein $Y^1$, $Y^2$ and $X^0$ are fluoro, as compounds containing a 3,4,5-trifluorophenyl group.

18. A medium according to claim 1, wherein $R^0$ is n-alkyl, alkoxy, fluoroalkyl, alkenyl or oxaalkenyl, each having up to 9 C atoms.

19. A liquid-crystalline medium according to claim 1, wherein a is 1.

20. A liquid-crystalline medium according to claim 1, wherein the amount of compounds of formula I1-I3 is at least 80%.

* * * * *

UNITED STATES PATENT AND TRADEMARK OFFICE
CERTIFICATE OF CORRECTION

PATENT NO.       : 7,452,575 B2                                    Page 1 of 1
APPLICATION NO.  : 10/537805
DATED            : November 18, 2008
INVENTOR(S)      : Francis et al.

It is certified that error appears in the above-identified patent and that said Letters Patent is hereby corrected as shown below:

On the Title Pg, Item (75) Inventors: line 2, reads "Mark Goulding" should read -- Mark John Goulding --
Column 61, line 18, reads "CH2" should read -- $CH_2$ --
Column 62, formulae I3a, I3b, and I3c should read
--

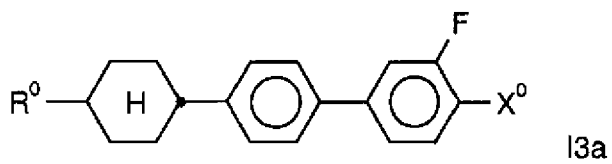

I3a

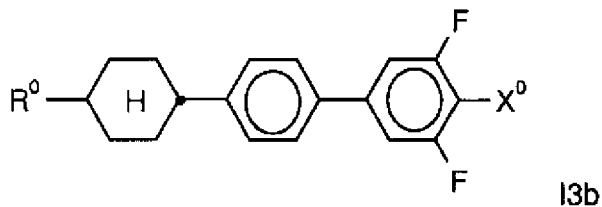

I3b

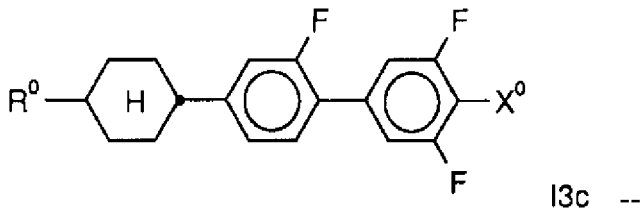

I3c  --

Column 64, line 12, reads "claim 4," should read -- claim 3, --
Column 64, line 13, reads "formula ha" should read -- formula I1a --

Signed and Sealed this

Twenty-third Day of June, 2009

JOHN DOLL
*Acting Director of the United States Patent and Trademark Office*